(12) United States Patent
Han et al.

(10) Patent No.: US 12,192,804 B2
(45) Date of Patent: Jan. 7, 2025

(54) CELL MEASUREMENT METHOD AND APPARATUS

(71) Applicant: Huawei Technologies Co., Ltd., Shenzhen (CN)

(72) Inventors: Feng Han, Shanghai (CN); Yinghao Jin, Shanghai (CN); Wei Tan, Shanghai (CN); Chunhua You, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 668 days.

(21) Appl. No.: 17/204,142

(22) Filed: Mar. 17, 2021

(65) Prior Publication Data

US 2021/0219154 A1 Jul. 15, 2021

Related U.S. Application Data

(63) Continuation of application No. PCT/CN2019/106274, filed on Sep. 17, 2019.

(30) Foreign Application Priority Data

Sep. 18, 2018 (CN) .......................... 201811090155.3

(51) Int. Cl.
H04W 24/08 (2009.01)
H04B 7/06 (2006.01)
(Continued)

(52) U.S. Cl.
CPC .......... H04W 24/08 (2013.01); H04B 7/0626 (2013.01); H04L 5/0048 (2013.01); H04W 24/10 (2013.01); H04W 76/27 (2018.02)

(58) Field of Classification Search
CPC ... H04W 88/06; H04W 72/046; H04W 72/23; H04W 72/53; H04W 72/535;
(Continued)

(56) References Cited

U.S. PATENT DOCUMENTS

2006/0160541 A1 7/2006 Ryu
2012/0108199 A1* 5/2012 Wang .................... H04W 24/10
709/224
(Continued)

FOREIGN PATENT DOCUMENTS

CN 101420711 A 4/2009
CN 104488314 A 4/2015
(Continued)

OTHER PUBLICATIONS

"3rd Generation Partnership Project; Technical Specification Group Radio Access Network; NR; NR and NG-RAN Overall Description; Stage 2 (Release 15)," 3GPP TS 38.300 V15.2.0, Jun. 2018, 87 pages.
(Continued)

*Primary Examiner* — Michael K Phillips
(74) *Attorney, Agent, or Firm* — SLATER MATSIL, LLP

(57) ABSTRACT

A cell measurement method and cell measurement apparatus, the method including
receiving, by a terminal device, first information from a network device, where the first information indicates a measurement parameter used by the terminal device to perform cell measurement in an idle state or an inactive state, and a detection signal for the cell measurement includes at least a synchronization sequence or physical broadcast channel block (SSB) or a channel state information reference signal (CSI-RS), and sending, by the terminal device, a measurement result of the cell measurement to the network device based on the first information.

30 Claims, 7 Drawing Sheets

(51) Int. Cl.
*H04L 5/00* (2006.01)
*H04W 24/10* (2009.01)
*H04W 76/27* (2018.01)

(58) Field of Classification Search
CPC .... H04W 76/27; H04W 80/02; H04B 7/0695; H04B 7/063; H04L 5/0051; H04L 25/0226; H04L 5/0094
See application file for complete search history.

(56) References Cited

U.S. PATENT DOCUMENTS

| | | | | |
|---|---|---|---|---|
| 2012/0300686 | A1* | 11/2012 | Maeda | H04W 76/27 370/311 |
| 2016/0219475 | A1* | 7/2016 | Kim | H04W 76/15 |
| 2018/0124687 | A1* | 5/2018 | Park | H04W 48/12 |
| 2018/0198659 | A1 | 7/2018 | Ko et al. | |
| 2019/0037425 | A1* | 1/2019 | Hong | H04W 72/23 |
| 2019/0074886 | A1* | 3/2019 | Yoon | H04B 7/0617 |
| 2019/0306739 | A1* | 10/2019 | Kim | H04L 5/0096 |
| 2019/0306924 | A1* | 10/2019 | Zhang | H04B 7/063 |
| 2020/0022011 | A1* | 1/2020 | Lee | H04W 24/10 |
| 2020/0022040 | A1* | 1/2020 | Chen | H04W 36/08 |
| 2020/0092073 | A1* | 3/2020 | Papasakellariou | H04L 5/0053 |
| 2020/0120742 | A1* | 4/2020 | Mildh | H04W 76/27 |
| 2020/0128422 | A1* | 4/2020 | Kim | H04W 24/10 |
| 2021/0235265 | A1* | 7/2021 | Stattin | H04W 12/106 |
| 2021/0314785 | A1* | 10/2021 | Raghavan | H04W 76/11 |

FOREIGN PATENT DOCUMENTS

| | | |
|---|---|---|
| CN | 107484198 A | 12/2017 |
| CN | 107820717 A | 3/2018 |
| CN | 108064050 A | 5/2018 |
| CN | 108235336 A | 6/2018 |
| EP | 3331266 A1 | 6/2018 |
| EP | 3873126 A1 | 9/2021 |
| WO | 2014008665 A1 | 1/2014 |
| WO | 2014024025 A1 | 2/2014 |
| WO | 2020034568 A1 | 2/2020 |
| WO | 2020147120 A1 | 7/2020 |

OTHER PUBLICATIONS

"3rd Generation Partnership Project; Technical Specification Group Radio Access Network; NR; Radio Resource Control (RRC) protocol specification (Release 15)," 3GPP TS 38.331 V15.2.1, Jun. 2018, 303 pages.

"Signalling for euCA (Enhancing LTE CA Utilization)," Source to WG: Nokia, Nokia Shanghai Bell, Source to TSG: R2, Work item code: LTE_euCA-Core, Date: Sep. 11, 2018, Category: B, Release: Rel-15, Change Request, 36.331, CR 3391, rev 8, Current version: 15.2.2, 3GPP TSG RAN Meeting #81, RP-182006, Gold Coast, Australia, Sep. 10-13, 2018, 129 pages.

"Fast SCell Configuration and Activation Through Network Assisted RRC_Idle Mode Measurements," Agenda Item: 9.9.2, Source: Qualcomm Incorporated, Document for: Discussion and Decision, 3GPP TSG-RAN2 Meeting #99, R2-1707788, Aug. 21-25, 2017, 5 pages.

"Open Issues for Early Measurement Configuration," Agenda Item: 11.10.3, Source; OPPO, Document for: Discussion and Decision, 3GPP TSG-RAN2#106, R2-1905586, Apr. 13-17, 2019, 6 pages.

"CA Establishment from Idle and Suspended," Agenda Item: 9.9.2, Source: Ericsson, Document for: Discussion, Decision, 3GPP TSG-RAN WG2 #99bis, Tdoc R2-1711534, Oct. 9-13, 2017, 3 pages.

"3rd Generation Partnership Project; Technical Specification Group Services and System Aspects; System Architecture for the 5G System; Stage 2 (Release 15)," 3GPP TS 23.501 V15.3.0, Sep. 2018, 226 pages.

"Measurement reporting for NR SS and CSI-RS," Agenda Item: 10.4.1.4.3, Source: Huawei, HiSilicon, Document for: Discussion and Decision, 3GPP TSG-RAN WG2 NR AdHoc #2, R2-1706729, Qingdao, China, Jun. 27-29, 2017, 3 pages.

"Identities of the NR-SS and CSI-RS for RRM Measurement," Agenda item: 10.2.14, Source: Samsung, Document for: Discussion & Decision, 3GPP TSG-RAN WG2 2017 RAN2 Ad-hoc Meeting, R2-1707309, Qingdao, China, Jun. 27-29, 2017 (Updated from R2-1705733), 3 pages.

"RRC_Idle measurements of potential SCells," Source: Ericsson, Agenda item: 8.30.2, Document for: Discussion, 3GPP TSG-RAN WG4 Meeting #85, R4-1712497, Reno, USA, Nov. 27-Dec. 1, 2017, 5 pages.

"Signalling for euCA," Source to WG: Nokia, Nokia Shanghai Bell, Source to TSG: R2, Work Item Code: LTE_euCA-Core, Category: B, 3GPP TSG-WG2 Meeting #103, R2-1813154, Gothenburg, Sweden, Aug. 20-24, 2018, 129 pages.

* cited by examiner

CELL MEASUREMENT METHOD AND APPARATUS

CROSS-REFERENCE TO RELATED APPLICATIONS

This application is a continuation of International Application No. PCT/CN2019/106274, filed on Sep. 17, 2019, which claims priority to Chinese Patent Application No. 201811090155.3, filed on Sep. 18, 2018. The disclosures of the aforementioned applications are hereby incorporated by reference in their entireties.

TECHNICAL FIELD

This application relates to the communications field, and in particular, to a cell measurement method and an apparatus.

BACKGROUND

In a communications system, to enable a terminal device to quickly perform communication after the terminal device switches from an idle state to a connected state, a network device may indicate the terminal device in the idle state to perform cell measurement. After the terminal device switches from the idle state to the connected state, the terminal device may report a measurement result of the cell measurement to the network device. For example, after performing security activation, the network device may indicate the terminal device to report the measurement result that is of the cell measurement and that is obtained by the terminal device when the terminal device is in the idle state, so that the terminal device quickly establishes communication. For example, in a carrier aggregation scenario, the terminal device may quickly establish communication with a secondary cell. With continuous evolution of the communications system, a condition and an environment for performing cell measurement also change. Therefore, how to improve cell measurement efficiency of the terminal device based on an evolved communications system is an urgent problem to be resolved in the industry.

SUMMARY

This application provides a cell measurement method and an apparatus, to improve cell measurement efficiency.

According to one aspect, a cell measurement method is provided. The method includes A terminal device receives first information from a network device, where the first information is used to indicate a measurement parameter used by the terminal device to perform cell measurement in an idle state or an inactive state, and a detection signal for the cell measurement includes at least a synchronization sequence or physical broadcast channel block (SSB) or a channel state information reference signal (CSI-RS). The terminal device sends a measurement result of the cell measurement to the network device based on the first information.

In this embodiment of this application, the detection signal used by the terminal device to perform cell or beam measurement may include at least the SSB or the CSI-RS. This improves cell or beam detection efficiency.

In this embodiment of this application, the terminal device performs the cell or beam measurement in the idle state or the inactive state, so that the terminal device can quickly report a cell or beam measurement result to the network device after entering a connected state, and the network device can quickly set up one or more secondary cells for the terminal device based on the cell or beam measurement result, to reduce a latency of setting up the secondary cell, and improve communication efficiency. For example, the network device may allocate, based on the cell or beam measurement result, a random access resource to the terminal device for accessing the one or more secondary cells. This can reduce the latency of setting up the secondary cell, and improve a random access success rate.

In one embodiment, the measurement parameter includes at least one of SSB frequency, a subcarrier spacing, an SSB measurement timing configuration, an SSB measurement threshold, and a quantity of SSBs to average for measurement.

In one embodiment, the measurement parameter includes at least one of a CSI-RS carrier, a reference signal configuration, a CSI-RS measurement threshold, and a quantity of CSI-RSs to average for measurement.

In one embodiment, the measurement parameter includes at least one of cell priority information, used to indicate to preferentially report a measurement result of a first cell, SSB priority information, used to indicate to preferentially report a measurement result of a first SSB, CSI-RS priority information, used to indicate to preferentially report a measurement result of a first CSI-RS, validity area information, used to indicate that after the terminal device leaves a validity area, the terminal device does not need to perform cell measurement when the terminal device is in the inactive state, and radio access network (RAN) area priority information, used to indicate to preferentially report a measurement result of a first RAN area.

In one embodiment, that the terminal device sends a measurement result of the cell measurement to the network device based on the first information includes The terminal device sends a partial measurement result of the cell measurement to the network device in a radio resource control (RRC) resume complete message, where the partial measurement result includes at least one of the measurement result of the first cell, the measurement result of the first SSB, the measurement result of the first CSI-RS, and the measurement result of the first RAN area. After sending the RRC resume complete message, the terminal device sends a remaining measurement result of the cell measurement in a first RRC message.

In one embodiment, the method further includes The terminal device receives second information from the network device, where the second information indicates that the terminal device is allowed to report the measurement result of the cell measurement in an RRC resume complete message.

In one embodiment, the second information is carried in at least one of an RRC connection release message, a broadcast message, and an RRC resume message.

In one embodiment, the first information is carried in any one of an RRC connection release message, a broadcast message, and an RRC resume message.

In one embodiment, the measurement result of the cell measurement is carried in the RRC resume complete message.

In one embodiment, the method further includes The terminal device sends air interface capability information to the network device, where the air interface capability information is used to indicate at least one of the terminal device supports SSB-based cell measurement, the terminal device supports CSI-RS based cell measurement, the terminal device in the inactive state supports SSB-based cell measurement, and the terminal device in the inactive state supports CSI-RS based cell measurement.

According to another aspect, a cell measurement method is provided. The method includes A network device sends first information to a terminal device, where the first information is used to indicate a measurement parameter used by the terminal device to perform cell measurement in an idle state or an inactive state, and a detection signal for the cell measurement includes at least a synchronization sequence or physical broadcast channel block (SSB) or a channel state information reference signal (CSI-RS). The network device receives a measurement result of the cell measurement.

In one embodiment, the measurement parameter includes at least one of SSB frequency, a subcarrier spacing, an SSB measurement timing configuration, an SSB measurement threshold, and a quantity of SSBs to average for measurement.

In one embodiment, the measurement parameter includes at least one of a CSI-RS carrier, a reference signal configuration, a CSI-RS measurement threshold, and a quantity of CSI-RSs to average for measurement.

In one embodiment, the measurement parameter includes at least one of cell priority information, used to indicate to preferentially report a measurement result of a first cell, SSB priority information, used to indicate to preferentially report a measurement result of a first SSB, CSI-RS priority information, used to indicate to preferentially report a measurement result of a first CSI-RS, validity area information, used to indicate that after the terminal device leaves a validity area, the terminal device does not need to perform cell measurement when the terminal device is in the inactive state, and RAN area priority information, used to indicate to preferentially report a measurement result of a first RAN area.

In one embodiment, that the network device receives a measurement result of the cell measurement includes The network device receives a partial measurement result of the cell measurement in a radio resource control RRC resume complete message, where the partial measurement result includes at least one of the measurement result of the first cell, the measurement result of the first SSB, the measurement result of the first CSI-RS, and the measurement result of the first RAN area. After receiving the RRC resume complete message, the network device receives a remaining measurement result of the cell measurement in a first RRC message.

In one embodiment, the method further includes The network device sends second information to the terminal device, where the second information indicates that the terminal device is allowed to report the measurement result of the cell measurement in an RRC resume complete message.

In one embodiment, the second information is carried in at least one of an RRC connection release message, a broadcast message, and an RRC resume message.

In one embodiment, the first information is carried in any one of an RRC connection release message, a broadcast message, and an RRC resume message.

In one embodiment, the measurement result of the cell measurement is carried in the RRC resume complete message.

In one embodiment, the method further includes The network device receives air interface capability information from the terminal device, where the air interface capability information is used to indicate at least one of the terminal device supports SSB-based cell measurement, the terminal device supports CSI-RS based cell measurement, the terminal device in the inactive state supports SSB-based cell measurement, and the terminal device in the inactive state supports CSI-RS based cell measurement.

According to yet another aspect, a cell measurement method is provided. The method includes A primary network device receives third information sent by a secondary network device, where the third information is used to indicate at least a cell list or a radio access network (RAN) area list that are/is recommended by the secondary network device for cell measurement. The primary network device sends fourth information to a terminal device based on the third information, where the fourth information is used to indicate at least a cell list or a RAN area list used by the terminal device to perform cell measurement in an idle state or an inactive state.

In this embodiment of this application, the primary network device may generate, based on the third information sent by the secondary network device, at least the cell list or the RAN area list used by the terminal device to perform the cell measurement, to improve cell measurement efficiency.

According to still another aspect, a cell measurement method is provided. The method includes A secondary network device generates third information, where the third information is used to indicate at least a cell list or a radio access network RAN area list that are/is recommended by the secondary network device for cell measurement. The secondary network device sends the third information to a primary network device.

According to another aspect, a communication method is provided. The method includes A terminal device determines that a bandwidth part (BWP) of a serving cell is in a dormant state, where the BWP is a subset of a bandwidth of the serving cell. When the BWP is in the dormant state, the terminal device reports channel state information (CSI) of the BWP, and further performs at least one of the following operations: skipping receiving a physical downlink control channel (PDCCH) by using the BWP, skipping sending a sounding reference signal SRS by using the BWP, skipping sending data of a physical uplink shared channel (PUSCH) by using the BWP, skipping sending a random access preamble signal by using the BWP, skipping monitoring a PDCCH for scheduling the BWP in a cross-carrier manner, and skipping sending a physical uplink control channel (PUCCH) by using the BWP.

In this embodiment of this application, when the BWP is in the dormant state, the terminal device may report the CSI based on the BWP. Because the terminal device may report the CSI of the BWP in the dormant state to the network device, after the BWP switches to an active state, the network device may quickly perform, based on the previously received CSI, effective BWP-based data scheduling with the terminal device.

In one embodiment, that a terminal device determines that a BWP of a serving cell is in a dormant state includes The terminal device receives first indication information from a network device, where the first indication information is used to indicate that the BWP is configured to be in the dormant state.

In one embodiment, the first indication information includes an identifier of the BWP.

In one embodiment, the first indication information is carried in DCI or a secondary cell addition message, and the secondary cell addition message is used to indicate to add a secondary cell.

In one embodiment, that a terminal device determines that a BWP of a serving cell is in a dormant state includes The terminal device receives first activation information from the network device, where the first activation information is used to indicate that the BWP is configured to be in the active state. The terminal device starts a first timer after receiving the first activation information. When the terminal device performs data scheduling, the terminal device starts or restarts the first timer. When the first timer expires, the terminal device determines that the BWP is in the dormant state.

In one embodiment, the method further includes The terminal device receives second indication information from the network device, where the second indication information is used to indicate duration of the first timer.

In one embodiment, the method further includes The terminal device starts a second timer after the BWP enters the dormant state. When the second timer expires, the terminal device determines that the BWP is configured to be in a deactivated state.

In one embodiment, the method further includes The terminal device receives third indication information from the network device, where the third indication information is used to indicate duration of the second timer.

According to yet another aspect, a communication method is provided. The method includes A network device sends first indication information to a terminal device, where the first indication information is used to indicate that a BWP in a serving cell is configured to be in a dormant state, and the BWP is a subset of a bandwidth in the serving cell. The network device receives a CSI that is of the BWP and that is reported by the terminal device.

In one embodiment, the first indication information includes an identifier of the BWP.

In one embodiment, the first indication information is carried in downlink control information (DCI) or a secondary cell addition message, and the secondary cell addition message is used to indicate to add a secondary cell.

In one embodiment, the network device sends first activation information to the terminal device, where the first activation information is used to indicate that the BWP is configured to be in an active state.

According to still another aspect, a communications apparatus is provided, and the communications apparatus has functions of implementing the terminal device in the foregoing method embodiments. The functions may be implemented by hardware, or implemented by hardware executing corresponding software. The hardware or the software includes one or more units corresponding to the foregoing functions.

According to another aspect, a communications apparatus is provided, and the communications apparatus has functions of implementing the network device in the foregoing method embodiments. The functions may be implemented by hardware, or implemented by hardware executing corresponding software. The hardware or the software includes one or more units corresponding to the foregoing functions.

According to yet another aspect, a communications apparatus is provided. The communications apparatus may be the terminal device in the foregoing method embodiments, or may be a chip disposed in the terminal device. The communications apparatus includes a memory, a communications interface, and a processor. The memory is configured to store a computer program or an instruction. The processor is coupled to the memory and the communications interface. When the processor executes the computer program or the instruction, the communications apparatus is enabled to perform the method performed by the terminal device in the foregoing method embodiments.

According to still another aspect, a communications apparatus is provided. The communications apparatus may be the network device in the foregoing method embodiments, or may be a chip disposed in the network device. The communications apparatus includes a memory, a communications interface, and a processor. The memory is configured to store a computer program or an instruction. The processor is coupled to the memory and the communications interface. When the processor executes the computer program or the instruction, the communications apparatus is enabled to perform the method performed by the network device in the foregoing method embodiments.

According to another aspect, a computer program product is provided. The computer program product includes computer program code. When the computer program code is run on a computer, the computer is enabled to perform the method performed by the terminal device in the foregoing aspects.

According to yet another aspect, a computer program product is provided. The computer program product includes computer program code. When the computer program code is run on a computer, the computer is enabled to perform the method performed by the network device in the foregoing aspects.

According to still another aspect, this application provides a chip system. The chip system includes a processor, configured to implement functions of the terminal device in the method in the foregoing aspects, for example, receiving or processing at least data or information in the foregoing method. In a possible design, the chip system further includes a memory. The memory is configured to store at least a program instruction or data. The chip system may include a chip, or may include a chip and another discrete component.

According to another aspect, this application provides a chip system. The chip system includes a processor, configured to implement functions of the network device in the method in the foregoing aspects, for example, receiving or processing at least data or information in the foregoing method. In a possible design, the chip system further includes a memory. The memory is configured to store at least a program instruction or data. The chip system may include a chip, or may include a chip and another discrete component.

According to yet another aspect, this application provides a computer-readable storage medium. The computer-readable storage medium stores a computer program. When the computer program is run, the method performed by the terminal device in the foregoing aspects is implemented.

According to still another aspect, this application provides a computer-readable storage medium. The computer-readable storage medium stores a computer program. When the computer program is run, the method performed by the network device in the foregoing aspects is implemented.

DETAILED DESCRIPTION OF ILLUSTRATIVE EMBODIMENTS

Figure 1:
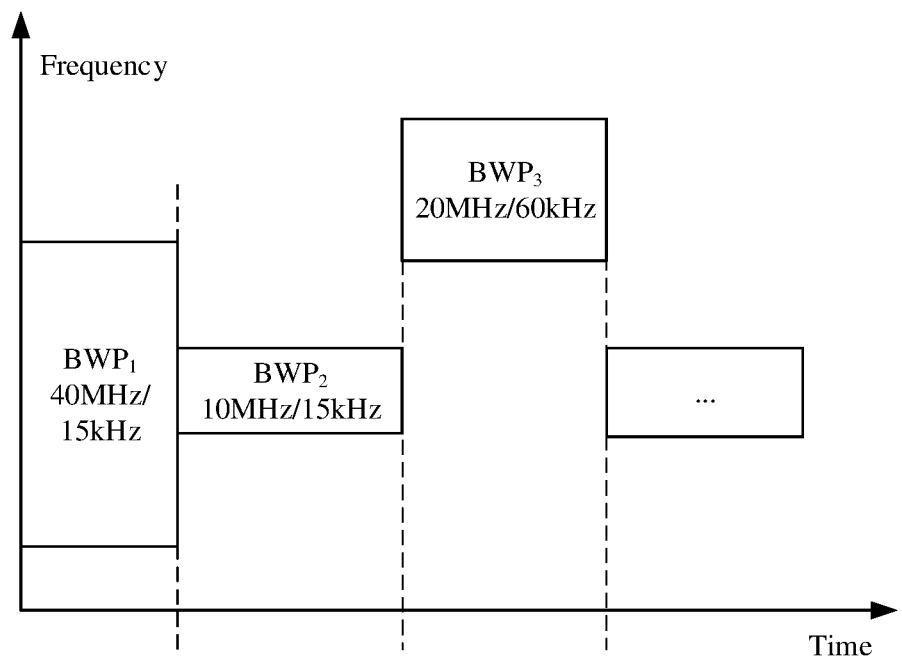
FIG. 1 is a schematic distribution diagram of BWPs in a cell according to an embodiment of this application.

The following describes technical solutions of this application with reference to the accompanying drawings.

The technical solutions in embodiments of this application may be applied to various communications systems, for example, a long term evolution (LTE) system, a 5th generation (5G) mobile communications system, a new radio (NR) communications system, a next generation (NG) communications system, and a future mobile communications system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be an evolved NodeB (eNB or eNodeB) in an LTE system, or may be a radio controller in a cloud radio access network (CRAN) scenario, or the network device may be a relay station, an access point, a vehicle-mounted device, a new generation NodeB (gNodeB) in a 5G network, a base station in a future evolved PLMN, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems, for example, a Linux operating system, a Unix operating system, an Android operating system, an iOS operating system, or a Windows operating system, that implement service processing by using a process. The application layer includes applications such as a browser, an address book, word processing software, and instant communication software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device, the network device, or a functional module that is in the terminal device or the network device and that can invoke and execute the program.

For ease of understanding, several concepts in the embodiments of this application are first described.

Bandwidth part (BWP): A subset of an entire bandwidth in a cell may be referred to as a BWP. Alternatively, a part of a cell carrier may be referred to as a BWP. The BWP may refer to a part of frequency domain resources, in a carrier bandwidth, allocated by a network device to a terminal device. A size of the BWP may be less than or equal to a bandwidth capability of the terminal device, in other words, less than or equal to a maximum bandwidth supported by the terminal device. In addition, the BWP may be consecutive frequency domain resources. For example, the BWP may include a plurality of consecutive subcarriers. For another example, the BWP may include a plurality of consecutive physical resource blocks (PRBs). Alternatively, the BWP may be nonconsecutive frequency domain resources. The consecutive frequency domain resources help reduce resource allocation complexity, and the nonconsecutive frequency domain resources help utilize discrete resources. The terminal device may support a plurality of BWPs. In other words, the network device may configure a plurality of BWPs for the terminal device. When the plurality of BWPs are configured, the BWPs may overlap, or the BWPs may not overlap. In addition, frequency domain resources included in different BWPs may have a same subcarrier spacing or may have different subcarrier spacings.

For example, FIG. 1 is a schematic distribution diagram of BWPs in a cell according to an embodiment of this application. As shown in FIG. 1, in one cell, the terminal device may communicate with the network device by using only a part of a bandwidth of the entire cell based on bandwidth adaptability. The network device notifies the terminal device of a BWP that is currently in an active state. The terminal device may support only one BWP. For example, as shown in FIG. 1, the bandwidth of the cell may include a $BWP_1$, a $BWP_2$, a $BWP_3$, and the like. A bandwidth of the $BWP_1$ is 40 megahertz (MHz), and a subcarrier spacing is 15 kHz. A bandwidth of the $BWP_2$ is 10 MHz, and a subcarrier spacing is 15 kHz. A bandwidth of the $BWP_3$ is 20 MHz, and a subcarrier spacing is 60 kHz. At high frequency, a carrier bandwidth of the cell may reach hundreds of megahertz. The terminal device may communicate with the network device based on the BWP instead of the bandwidth of the cell. This reduces power consumption of the terminal device and improves scheduling flexibility.

Channel state information (CSI): CSI may be information that is sent by a terminal device to a network device and that is used to indicate channel quality of a downlink channel. The CSI may be obtained based on a downlink reference signal. The CSI includes at least one of a channel quality indicator (CQI), used to indicate a coding scheme used by the network device for subsequent scheduling, a rank indication (RI), used to indicate a quantity of valid data layers of a PDSCH and notify the network device of a quantity of codewords that can be currently supported by the terminal device, a precoding matrix indicator (PMI), used to indicate an index of a codebook set, a precoding type indicator (PTI), used to indicate a precoding type, a channel state information reference signal resource indicator (CRI), used to indicate a CSI-RS resource, a reference signal received power (RSRP), used to indicate radio signal strength, to be specific, indicate an average value of signal received powers of all resource elements (RE) that carry reference signals in a symbol, and a channel state information reference signal (CSI-RS), used for channel estimation and CQI feedback.

Idle state: A terminal device in an idle state does not store context information of the terminal device, performs PLMN selection and cell reselection in the state, and receives a paging message from a core network. In this case, the core network stores the context information of the terminal device.

Inactive state: A terminal device in an inactive state stores context information of the terminal device, performs PLMN selection and cell reselection in the state, and receives a paging message from a radio access network. In this case, the radio access network and a core network store the context information of the terminal device. The radio access network may be a next generation radio access network (NG-RAN).

Connected state: A connected state may also be referred to as an active state (activation). A terminal device in the connected state has control plane and user plane connections to an access network device and a core network device. The access network device, the core network device, and the terminal device store context information of the terminal device, and the access network device controls mobility of the terminal device.

Synchronization sequence or physical broadcast channel block (SSB): An SSB may include a primary synchronization signal, a secondary synchronization signal, a physical layer broadcast channel, and the like.

Figure 2:
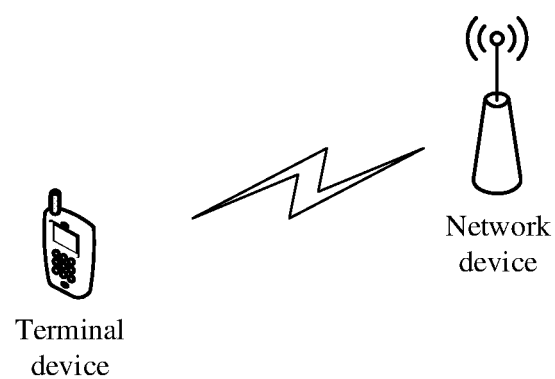
FIG. 2 is a schematic diagram of an application environment according to an embodiment of this application.

FIG. 2 is a schematic diagram of a possible application scenario according to an embodiment of this application. As shown in FIG. 2, the application scenario may include a terminal device and a network device. For specific descriptions of the terminal device and the network device, refer to the foregoing related descriptions. In an example, the terminal device may be a mobile terminal, and the network device may be an access network device. As shown in FIG. 2, the terminal device may access a network via the network device, and the terminal device and the network device may communicate with each other over a radio link.

Figure 3:
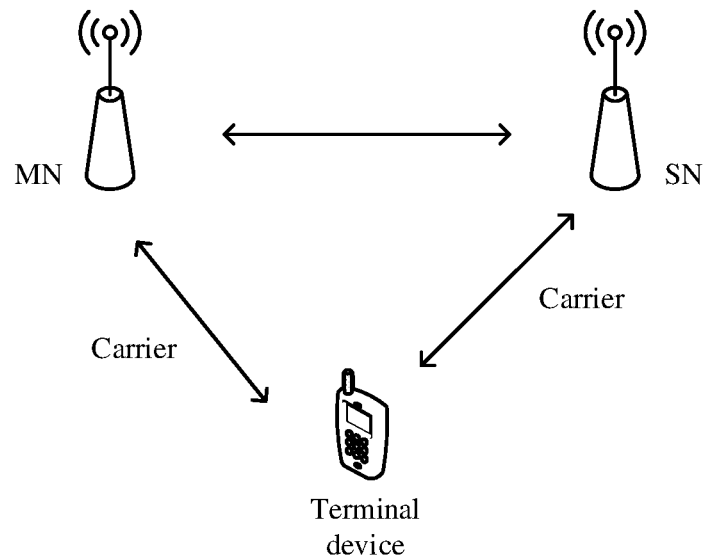
FIG. 3 is a schematic diagram of a dual connectivity scenario according to an embodiment of this application.

FIG. 3 is a schematic architectural diagram of a dual connectivity scenario according to an embodiment of this application. As shown in FIG. 3, a master node (MN) and a secondary node (SN) are usually included in the dual connectivity scenario. The master node may also be referred to as a primary base station, and the secondary node may also be referred to as a secondary base station. Alternatively, the master node may also be referred to as a primary network device, and the secondary node may also be referred to as a secondary network device. The primary base station may include a primary cell and a secondary cell, the secondary base station may also include a primary cell and a secondary cell, and the primary cell in the secondary base station may also be referred to as a primary secondary cell (PScell). In the dual connectivity scenario, the MN and the SN may jointly serve a terminal device. In other words, for a same session established between the terminal device and a core network, the primary base station and the secondary base station may perform data transmission with the terminal device. In a possible scenario, the primary base station may be responsible for a control plane signaling transmission and user plane data transmission with the terminal device, and the secondary base station only needs to be responsible for user plane data transmission with the terminal device. In other words, the primary base station may establish a data resource bearer (DRB) and a signaling resource bearer (SRB) with the terminal device, and the secondary base station only needs to establish a DRB with the terminal device. Alternatively, in another possible scenario, the primary base station and the secondary base station each may be responsible for control plane signaling transmission and user plane data transmission with the terminal device. In other words, the primary base station may establish a DRB and an SRB with the terminal device, and the secondary base station may also establish a DRB and an SRB with the terminal device.

Figure 4:
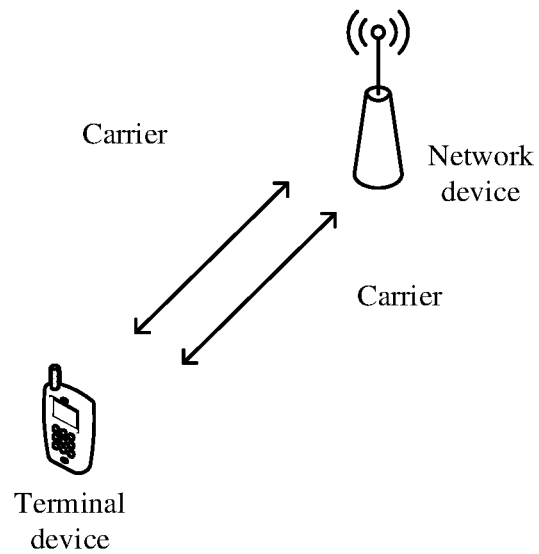
FIG. 4 is a schematic diagram of a carrier aggregation scenario according to an embodiment of this application.

FIG. 4 shows a carrier aggregation scenario according to an embodiment of this application. Carrier aggregation refers to aggregating two or more component carriers (CC) together to transmit data, so as to implement a larger transmission bandwidth. A terminal device may determine, based on a capability of the terminal device, a maximum quantity of carriers that can be simultaneously used for uplink or downlink transmission. A CA function can be used to support contiguous or non-contiguous carrier aggregation and support intra-band or inter-band carrier aggregation. The terminal device may perform data transmission with a single network device through carrier aggregation. Alternatively, the terminal device may perform data transmission with a plurality of network devices through carrier aggregation. A typical implementation of the latter is to aggregate carriers of one macro base station and several micro base stations. The micro base stations need to be connected to the macro base station by using a backhaul link, and perform strict system time synchronization with the macro base station.

A similarity between a carrier aggregation technology and a dual connectivity technology lies in that a terminal device performs data transmission with one or more network devices by using a plurality of carriers. A difference between the carrier aggregation technology and the dual connectivity technology lies in that scheduling of the plurality of carriers in carrier aggregation is completed by one network device or a scheduler of the network device, but in a dual connectivity scenario, schedulers of a primary network device and a secondary network device separately manage carriers of respective network devices, and therefore coordination needs to be performed between the network devices. A function of the scheduler may be a functional entity executed by a processor of the network device. In an example, in the carrier aggregation scenario, resources are managed in a lower protocol layer, and a user data transmission latency is relatively low. In the dual connectivity scenario, resources are managed on a higher protocol layer, and a user data transmission latency is relatively high. There are other differences between the carrier aggregation technology and the dual connectivity technology, and details are not described herein.

Figure 5:
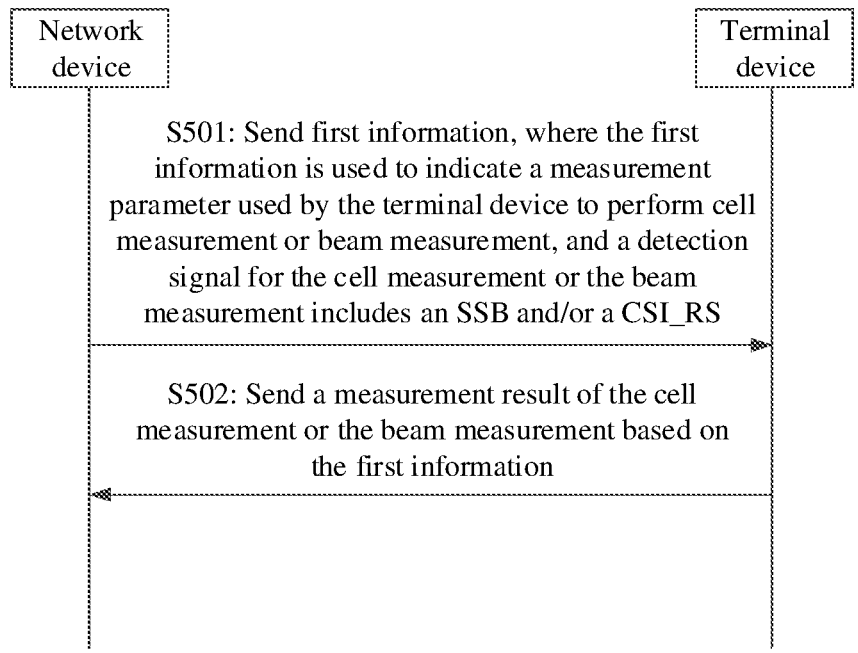
FIG. 5 is a schematic diagram of a cell or beam measurement method according to an embodiment of this application.

FIG. 5 is a schematic flowchart of a cell or beam measurement method according to an embodiment of this application. The method shown in FIG. 5 includes the following operations.

S501: A network device sends first information to a terminal device, and correspondingly, the terminal device receives the first information from the network device, where the first information is used to indicate a measurement parameter used by the terminal device to perform cell measurement or beam measurement, and a detection signal for the cell measurement or the beam measurement includes at least an SSB or a channel state information reference signal (CSI-RS).

In one embodiment, in a high-frequency scenario, the network device may use a beamforming technology to form a directional beam. In this case, the network device can completely cover a cell only by using a plurality of beams with different directions. Therefore, one cell may include a plurality of beams. A result obtained in the cell measurement may be a measurement result obtained after a measurement result of at least one beam included in the cell is averaged. A result obtained in the beam measurement may be a respective measurement result of one or more beams in the cell. For example, the terminal device may measure several beams with high signal quality in the cell, and obtain a measurement result of each beam.

In one embodiment, the method in this embodiment of this application may be used in the high frequency scenario in which the beamforming technology is used, or may be used in a low- and medium-frequency communication scenario.

It should be noted that the cell or beam measurement in this embodiment of this application may include only the cell measurement, or include only the beam measurement, or include both the cell measurement and the beam measurement. The beam measurement may be measurement performed on some or all beams included in the cell.

In one embodiment, the first information may be used to indicate a measurement parameter used by the terminal device to perform cell measurement or beam measurement in an idle state or an inactive state, or the first information may be used to indicate a measurement parameter used by the terminal device to perform cell or beam measurement in a connected state. Information included in the measurement parameter is described in detail in the following.

In one embodiment, the measurement parameter may be used to indicate the terminal device to perform the cell measurement or the beam measurement. For example, when the terminal device is in the idle state or the inactive state, the terminal device may perform the cell measurement or intra-cell beam measurement based on the measurement parameter configured by the network device. When the terminal device switches to the connected state, the terminal device may report, to the network device, results of measurement performed by the terminal device on a serving cell and another cell, or may report, to the network device, results of measurement performed by the terminal device on a beam in the serving cell and a beam in the another cell.

In an example, the first information may be carried in an RRC message. For example, the first information may be carried in an RRC connection release message, and the RRC connection release message is used to indicate the terminal device to leave the connected state. For example, when the terminal device is to switch from the connected state to the idle state or the inactive state, the network device sends the RRC connection release message to the terminal device, to indicate the terminal device to switch from the connected state to the idle state or the inactive state. In another example, the first information may be carried in an RRC resume message, and the RRC resume message may be used to indicate to resume an RRC connection between the terminal device and the network device. In still another example, the first information may alternatively be carried in an RRC reestablishment message, and the RRC reestablishment message may be used to indicate to reestablish an RRC connection between the terminal device and the network device. Alternatively, the first information may be carried in an RRC message of another type.

In one embodiment, the first information may alternatively be carried in a broadcast message.

S502: The terminal device sends the measurement result of the cell measurement or the beam measurement to the network device based on the first information, and correspondingly, the network device receives the measurement result of the cell measurement or the beam measurement.

In one embodiment, the terminal device may send the measurement result of the cell measurement or the beam measurement to the network device when the terminal device is in the connected state. For example, the terminal device may perform the cell measurement or the beam measurement in the idle state or the inactive state based on the first information, and may send the result of the cell measurement or the beam measurement to the network device after entering the connected state. In this way, after entering the connected state, the terminal device can quickly report the measurement result of the cell or the beam to the network device, so that the network device sets up a secondary cell for the terminal device as soon as possible. This reduces a latency of setting up the secondary cell, and improves communication efficiency.

In one embodiment, the result of the cell measurement or the beam measurement may be referred to as the cell or beam measurement result. The cell or beam measurement result may be carried in an RRC message. For example, if the terminal device switches from the inactive state to the connected state, the measurement result of the cell or beam measurement may be carried in an RRC resume complete message. The RRC resume complete message is used to indicate that the terminal device has switched from the inactive state to the connected state. Alternatively, the measurement result of the cell or beam measurement may be carried in another RRC message. For example, when the terminal device performs RRC connection reestablishment, the measurement result of the cell or beam measurement may be carried in an RRC reestablishment complete message, or may be carried in another RRC message. This is not limited in this embodiment of this application.

In one embodiment, the RRC resume complete message may carry a partial measurement result or an entire measurement result of the cell or beam measurement. Similarly, the RRC reestablishment complete message may also carry the partial measurement result or the entire measurement result of the cell or beam measurement.

In one embodiment, the cell or beam measurement result may also be carried in RRC dedicated signaling. For example, the cell or beam measurement result may be carried in a user equipment information response message.

In one embodiment, the measurement result that is of the cell or beam measurement and that is reported by the terminal device may include at least a measurement result of a current serving cell or a measurement result of a neighboring cell. The measurement result of the current serving cell may include at least one of a physical cell identifier, an SSB measurement result, and a CSI-RS measurement result. The measurement result of the neighboring cell may include at least one of an SSB measurement result, a CSI-RS measurement result, and information about a supported network slice. The measurement result that is of the cell measurement and that is reported by the terminal device is not limited to the listed content, and may further include another measurement result. This is not limited in this application. In one embodiment, the measurement results of the current serving cell and the neighboring cell may include one or more beam identifiers. The beam identifier may be an ARFCN or a beam index, the SSB measurement result, or the CSI-RS measurement result. The beam index may be an identifier of a beam detected by the terminal device. For example, the beam index may be carried in a reference signal sequence of the SSB, or carried in physical broadcast channel load, or carried in both a reference signal sequence of the SSB and physical broadcast channel load.

In this embodiment of this application, the detection signal used by the terminal device to perform the cell or beam measurement may include at least the SSB or the CSI-RS. This improves cell or beam detection efficiency.

In this embodiment of this application, the terminal device performs the cell or beam measurement in the idle state or the inactive state, so that the terminal device can quickly report the cell or beam measurement result to the network device after entering the connected state, and the network device can quickly set up one or more secondary cells for the terminal device based on the cell or beam measurement result, to reduce the latency of setting up the secondary cell, and improve the communication efficiency. For example, the network device may allocate, based on the cell or beam measurement result, a random access resource to the terminal device for accessing the one or more secondary cells. This can reduce the latency of setting up the secondary cell, and improve a random access success rate.

For example, in a dual connectivity scenario, the terminal device performs the cell measurement in the idle state or the inactive state, and sends the cell or beam measurement result to the network device after entering the connected state, so that the network device can quickly set up a secondary base station for the terminal device based on the cell or beam measurement result, to reduce a latency of setting up the secondary base station, and improve communication efficiency. The secondary base station established for the terminal device in the dual connectivity scenario may include a primary secondary cell or a secondary cell.

In one embodiment, the measurement parameter may include SSB-related measurement information. For example, the measurement parameter may include at least one of aSSB frequency, which is an absolute radio frequency channel number (ARFCN), and may be an NR ARFCN that indicates an NR global frequency raster, a subcarrier spacing, a synchronization signal/physical broadcast channel block measurement timing configuration (SMTC), where in this embodiment of this application, the SMTC may include an SMTC 1 and an SMTC 2, the SMTC 1 may be used to configure timing occasions at which the terminal device measures SSBs, and the SMTC 1 includes a periodicity and an offset of a measurement window for receiving SSBs, and also includes duration of the measurement window, where the periodicity, the offset, and the duration are given in quantity of subframes, and for a specified cell list, the SMTC 2 may be used by the terminal device to determine a periodicity of another SMTC measurement window based on a periodicity value in the SMTC 2, an SSB measurement threshold, where when the measurement result exceeds the SSB measurement threshold, the measurement result may be used as an input to export a cell-level or beam-level measurement result, and a quantity of SSBs to average for measurement, used to indicate an upper limit of a quantity of measurement results per beam based on SSBs to be averaged.

In one embodiment, the measurement parameter may further include CSI-RS related measurement information. For example, the measurement parameter may further include a CSI-RS carrier, indicating an absolute radio frequency channel number (ARFCN), where an NR ARFCN indicates an NR global frequency raster, a reference signal configuration, which may include, for example, a configuration of an SMTC, or a CSI-RS resource, a CSI-RS measurement threshold, used to indicate a CSI-RS based measurement threshold, and a quantity of CSI-RSs to average for measurement, used to indicate an upper limit of a quantity of measurement results per beam based on SSBs to be averaged.

In one embodiment, the measurement parameter further includes information used to indicate to perform the cell or beam measurement based on a reference signal received power (RSRP), reference signal received quality (RSRQ), or a signal to interference plus noise ratio (SINR), or information used to indicate to perform the cell or beam measurement based on any combination of the foregoing three.

In one embodiment, the measurement parameter may further include information about a slice supported by each SSB frequency or CSI-RS frequency, so that the terminal device preferentially selects specific frequency to perform the cell measurement. In one embodiment, in this embodiment of this application, frequency may also be referred to as a frequency band or a carrier.

In one embodiment, the measurement parameter may further include a validity cell list. For example, the list may be a physical cell list. If the terminal device leaves a cell indicated in the validity cell list, the terminal device does not need to perform the cell measurement.

In one embodiment, the measurement parameter may further include a measurement area list. For example, the measurement area list may be a radio access network (RAN) area list, and may indicate the terminal device to perform the cell measurement on an area in the measurement area list.

In one embodiment, the measurement parameter may include priority information, and the priority information may be used to indicate the terminal device to preferentially report a partial measurement result. For example, the priority information may include at least one of cell priority information, used to indicate to preferentially report a measurement result of a first cell, SSB priority information, used to indicate to preferentially report a measurement result of a first SSB, CSI-RS priority information, used to indicate to preferentially report a measurement result of a first CSI-RS, and RAN area priority information, used to indicate to preferentially report a measurement result of a first RAN area. The first cell may be one or more cells, the first SSB may include one or more SSBs, the first CSI may include one or more CSI-RSs, and the first RAN area may include one or more RAN areas. For example, the priority information may include beam-based priority information.

After receiving the first information, the terminal device may preferentially report the measurement result of the first cell, the first SSB, the first CSI-RS, or the first RAN area based on the priority information. For example, that the terminal device sends the measurement result of the cell measurement to the network device based on the first information includes The terminal device sends a partial measurement result of the cell measurement to the network device in an RRC resume complete message. The partial measurement result includes at least one of the measurement result of the first cell, the measurement result of a first beam, the measurement result of the first SSB, the measurement result of the first CSI-RS, and the measurement result of the first RAN area. After sending the RRC resume complete message, the terminal device sends a remaining measurement result of the cell measurement in a first RRC message. The first RRC message may be another RRC message sent by the terminal device after the RRC resume complete message. A format of the first RRC message is not limited in this embodiment of this application. For example, the network device may send a user equipment information request message to the terminal device, and the terminal device may send a user equipment information response message to the network device, and may include the remaining measurement result of the cell measurement in the user equipment information response message. In one embodiment, the terminal device may further indicate, in the RRC resume complete message, that there is a remaining measurement result to be reported in a subsequent RRC message.

In one embodiment, the network device may explicitly or implicitly indicate the priority information. For example, the measurement parameter may further include a measurement cell list, a measurement beam list, an SSB list, a CSI-RS list, and an area list that are described below. The cell priority information may be carried in the measurement cell list. The SSB priority information may be carried in the SSB list, the CSI-RS priority information may be carried in the CSI-RS list, and the area priority information may be carried in the validity area list.

The measurement cell list may be a physical cell identifier (PCI) list, and is used to indicate the terminal device to perform the cell measurement. In one embodiment, a priority of a cell may be indicated in the measurement cell list. In this way, when reporting a measurement result, the terminal device may preferentially report a measurement result of a cell with a high priority. The priority of the cell may be explicitly or implicitly indicated. For example, one or more cells with a high priority, namely, the first cell, in the measurement cell list may be clearly indicated. In another example, a priority sequence of cells may be indicated in the measurement cell list. For example, the cell list may be sorted in descending order of priorities, or the cell list may be sorted in ascending order of priorities.

A priority of an SSB may be indicated in the SSB list. In this way, when reporting a measurement result, the terminal device may preferentially report a measurement result of an SSB with a high priority. For example, one or more SSBs with a high priority, namely, the first SSB, in the SSB list may be clearly indicated. In another example, a priority sequence of SSBs may be indicated in the SSB list. For example, the SSB list may be sorted in descending order of priorities, or the SSB list may be sorted in ascending order of priorities.

A priority of a CSI-RS may be indicated in the CSI-RS list. In this way, when reporting a measurement result, the terminal device may preferentially report a measurement result of a CSI-RS with a high priority. For example, one or more CSI-RSs with a high priority, namely, the first CSI-RS, in the CSI-RS list may be clearly indicated. In another example, a priority sequence of CSI-RSs may be indicated in the CSI-RS list. For example, the CSI-RS list may be sorted in descending order of priorities, or the CSI-RS list may be sorted in ascending order of priorities.

In one embodiment, the measurement parameter may further include validity area information, used to indicate that after the terminal device leaves a validity area, the terminal device does not need to perform cell measurement when the terminal device is in the inactive state. The validity area information may be the validity area list. The validity area list is defined as follows.

The validity area list may also be referred to as a radio access network-based notification area (RNA) list. If the terminal device leaves an area indicated in the validity area list, the terminal device does not need to perform the cell measurement when the terminal device is in the inactive state.

In one embodiment, the validity area list may include information indicating a priority of a RAN area. In this way, when reporting a measurement result, the terminal device may preferentially report a measurement result of a RAN area with a high priority. For example, one or more RAN areas with a high priority, namely, the first RAN area, in the validity area list may be clearly indicated. In another example, a priority sequence of RAN areas may be indicated in the validity area list. For example, the validity area list may be sorted in descending order of priorities, or the validity area list may be sorted in ascending order of priorities.

In one embodiment, the measurement parameter may further include the measurement area list, namely, the RAN area list, used to indicate the terminal device to perform the cell measurement on a RAN area in the measurement area list.

In one embodiment, the measurement parameter may further include measurement duration, a measurement periodicity, a layer 3 (L3) filtering coefficient, and the like. The measurement periodicity may be, for example, a multiple of the SMTC 1 or the SMTC 2, so that measurement power consumption of the terminal device in at least the idle state or the inactive state can be effectively reduced. In addition, the terminal device needs to send the measurement result of the cell measurement to the network device after performing L3 filtering. If an L3 filtering time is relatively long, the measurement result reported by the terminal device to the network device cannot accurately reflect a measurement result obtained before a state of the terminal device is switched. The state switching means that the terminal device switches from the idle state or the inactive state to the connected state. Therefore, the network device may configure a measurement time at which the terminal device reports the measurement result. For example, a time period between a moment at which the measurement result is obtained and a moment at which the terminal device performs state switching may be reported. For example, 5 minutes or 10 minutes may be reported. In one embodiment, to enable the terminal device to quickly perform the cell measurement, the network device may configure an L3 filtering periodicity for the terminal device.

In one embodiment, the terminal device may further receive second information from the network device. Correspondingly, the network device sends the second information. The second information indicates that the terminal device is allowed to report the measurement result of the cell or beam measurement in the RRC resume complete message. Alternatively, the second information may indicate that the terminal device is not allowed to report the measurement result of the cell or beam measurement in the RRC resume complete message. The terminal device may determine, based on the second information, whether to report the measurement result of the cell measurement in the RRC resume complete message.

Alternatively, the second information may indicate whether the terminal device is allowed to report the measurement result of the cell or beam measurement in another RRC message. For example, the second information may indicate to send the measurement result of the cell or beam measurement in the RRC reestablishment complete message.

In one embodiment, the terminal device may determine, based on an indication of the second information, whether to report the measurement result of the cell or beam measurement in the RRC resume complete message. In one embodiment, the terminal device may continuously report the cell or beam measurement result in the RRC resume complete message.

In one embodiment, the terminal device may report the entire measurement result of the cell measurement in the RRC resume complete message, or may report the partial measurement result of the cell measurement in the RRC resume complete message. For example, the terminal device may report, in the RRC resume complete message based on the priority information in the measurement parameter, only the measurement result of the first cell, the first SSB, the first CSI-RS, or the first RAN area with a high priority.

In one embodiment, the second information may be carried in the RRC connection release message, the broadcast message, or the RRC resume message, or may be carried in an RRC message of another type.

In one embodiment, the terminal device may further send air interface capability information to the network device. Correspondingly, the network device receives the air interface capability information from the terminal device. The air interface capability information may be used to indicate at least one of the terminal device supports SSB-based cell measurement, the terminal device supports CSI-RS based cell measurement, the terminal device in the inactive state supports SSB-based cell measurement, the terminal device in the inactive state supports CSI-RS based cell measurement, the terminal device in the idle state supports SSB-based cell measurement, the terminal device in the idle state supports CSI-RS based cell measurement, the terminal device supports SSB-based beam measurement, the terminal device supports CSI-RS based beam measurement, the terminal device in the inactive state supports SSB-based beam measurement, the terminal device in the inactive state supports CSI-RS based beam measurement, the terminal device in the idle state supports SSB-based beam measurement, and the terminal device in the idle state supports CSI-RS based beam measurement.

In one embodiment, the network device may be a primary network device or a primary base station in a dual connectivity scenario or a carrier aggregation scenario. Before the primary network device sends the first information to the terminal device, the primary network device may receive third information sent by the secondary network device. Correspondingly, the secondary network device sends the third information to the primary network device. The third information is used to indicate at least a cell list or a RAN area list that are/is recommended by the secondary network device for the cell or beam measurement. The primary network device may send fourth information to the terminal device based on the third information, where the fourth information is used to indicate at least a cell list or a RAN area list used by the terminal device to perform the cell or beam measurement.

In one embodiment, the fourth information may be used to indicate at least a cell list or a RAN area list used by the terminal device to perform the cell or beam measurement when the terminal device is in the idle state or the inactive state.

The first information may include the fourth information. In other words, the fourth information belongs to the measurement parameter in S501. For example, the fourth information may be the measurement cell list or the measurement area list in the measurement parameter. In one embodiment, the fourth information may include at least an entire or a partial cell list or RAN area list that are/is indicated in the third information. In one embodiment, the fourth information may further include at least a cell list or a RAN area list recommended by the network device for the cell or beam measurement. Alternatively, the fourth information may further include the cell priority information or the RAN area priority information.

Figure 6:
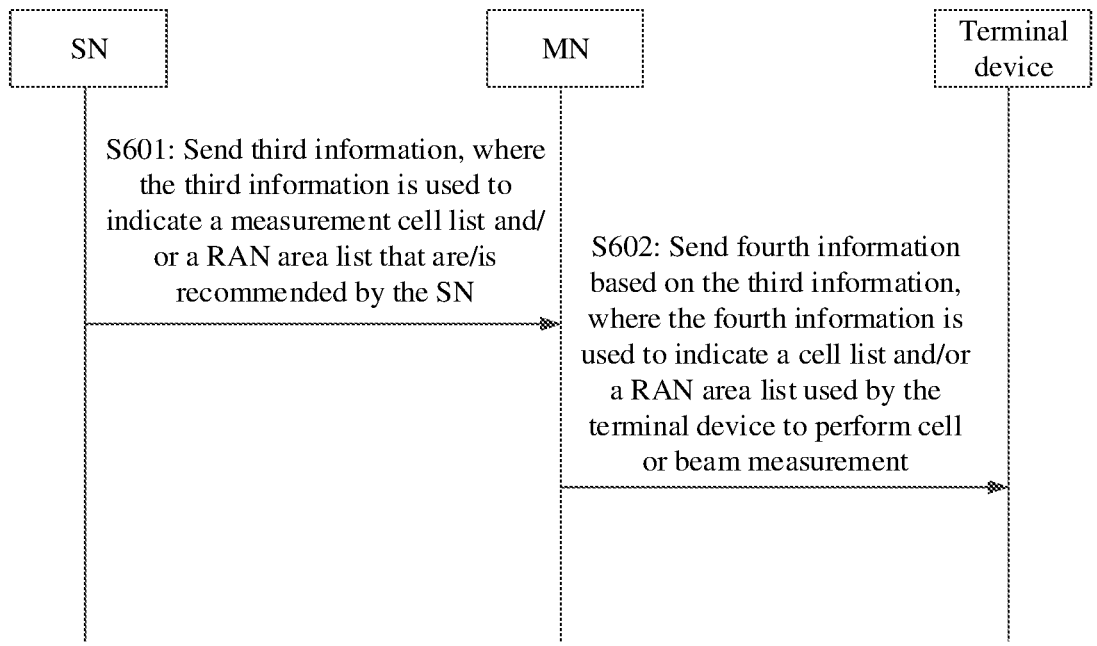
FIG. 6 is a schematic diagram of a cell or beam measurement method according to another embodiment of this application.

In a specific example, FIG. 6 is a schematic flowchart of a cell or beam measurement method according to another embodiment of this application. FIG. 6 shows a dual connectivity scenario. The foregoing primary network device may be an MN, and the foregoing secondary network device may be an SN. The method in FIG. 6 includes the following operations.

S601: The SN sends third information to the MN, and correspondingly, the MN receives the third information from the SN, where the third information is used to indicate at least a measurement cell list or a RAN area list that are/is recommended by the SN.

S602: The MN sends fourth information to a terminal device based on the third information, where the fourth information is used to indicate at least a cell list or a RAN area list used by the terminal device to perform cell or beam measurement.

The fourth information may include at least a partial or an entire measurement cell list or RAN area list indicated in the third information.

In the dual connectivity scenario, to effectively help the MN determine which cells or RAN areas are configured for measurement, the SN may provide the MN with at least the recommended cell list or RAN area list, so that the MN may configure, for the terminal device, at least the measurement cell list or the RAN area list recommended by the SN and at least a measurement cell list or a RAN area list recommended by the MN, to improve cell measurement efficiency.

In the dual connectivity scenario, the terminal device can measure a specific cell or area by using the measurement cell list or cell priority information provided by the SN, so as to quickly establish dual connectivity communication for the terminal device.

In one embodiment, the terminal device may further send fifth information to a network device, where the fifth information is used to indicate that the terminal device needs to report a cell or beam measurement result. For example, the fifth information is indicated by using 1 bit, to indicate that the terminal device has the cell or beam measurement result to be reported. The cell or beam measurement result may be obtained through measurement by the terminal device in an idle state or an inactive state. For example, the fifth information is indicated by using 2 bits. "00" may indicate that the terminal device has cell and beam measurement results to be reported, "01" may indicate that the terminal device has only a cell measurement result to be reported, "10" may indicate that the terminal device has only a beam measurement result to be reported, and "11" may indicate that the terminal device has no measurement result to be reported.

The fifth information may be carried in an RRC resume request message, an RRC setup request message, an RRC reestablishment request message, or an RRC setup complete message, may be carried in an RRC resume complete message, an RRC setup complete message, or an RRC reestablishment complete message, or may be carried in another RRC message.

In some examples, the fifth information may alternatively be carried in a cause value. The cause value may be a resume cause value in the RRC resume request message, may be an establishment cause value in the RRC setup request message, or may be a reestablishment cause value in the RRC reestablishment request message.

In an implementation, the fifth information may indicate that the terminal device has only the cell or beam measurement result to be reported. In another implementation, the fifth information may indicate that the terminal device has the cell measurement result to be reported, and may indicate that an access cause is a mobile originating call, or the access reason may be other content. In another implementation, the fifth information may indicate that the terminal device has the cell or beam measurement result to be reported, and indicate that an access cause is a mobile originating voice call. In an implementation, the fifth information may indicate whether the cell measurement result is reported based on an SSB or a CSI-RS.

In another implementation, the terminal device may report, to the network device through the fifth information, whether the terminal device needs to report an SSB-based cell measurement result or an SSB-based beam measurement result. Alternatively, the terminal device may report, to the network device through the fifth information, whether the terminal device needs to report a CSI-RS based cell measurement result or a CSI-RS based beam measurement result. Alternatively, the fifth information may indicate to report any one or any combination of the foregoing content. The network device may send a user equipment information request message to the terminal device. Correspondingly, the terminal device receives the user equipment information request message. The user equipment request message may include at least one of the network device allows the terminal device to report the SSB-based cell measurement result or the SSB-based beam measurement result of the terminal device, the network device allows the terminal device to report the CSI-RS based cell measurement result or the CSI-RS based beam measurement result of the terminal device, or any combination thereof. After receiving the user equipment information request message, the terminal device may send the measurement result of the cell or beam measurement to the network device. The measurement result of the cell or beam measurement may be carried in a user equipment information response message.

In an example, if the terminal device is in a process of switching from the idle state to a connected state, the fifth information may be carried in the RRC setup complete message, and the terminal device may indicate, to the network device through the fifth information in the RRC setup complete message, that the terminal device has the cell or beam measurement result to be reported. After security activation, the network device may request the terminal device to send the measurement result of the cell or beam measurement.

In an example, if the terminal device is in a process of switching from the inactive state to a connected state, the fifth information may be carried in the RRC resume request message, and the terminal device may indicate, to the network device through the fifth information in the RRC resume request message, that the terminal device has the cell or beam measurement result to be reported. For example, one or more bits are used to indicate that the terminal device has the measurement result to be reported. The terminal device may report the measurement result of the cell or beam measurement to the network device in the RRC resume complete message.

In an example, if the terminal device performs RRC connection reestablishment, the fifth information may be carried in an RRC reestablishment request message, and the terminal device may indicate, to the network device through the fifth information in the RRC reestablishment request message, that the terminal device has the cell or beam measurement result to be reported. For example, one or more bits are used to indicate that the terminal device has the measurement result to be reported. The terminal device reports the measurement result of the cell or beam measurement to the network device in the RRC reestablishment complete message.

To enable a serving cell to quickly switch to an active state, this embodiment of this application defines a dormant state of the serving cell. The serving cell may include at least a primary cell or a secondary cell, and a state of the serving cell is specific to the terminal device. To be specific, the serving cell may be always in a working state. However, for different terminal devices, the serving cell may be in different states. For example, for a first terminal device, the serving cell may be in the active state, and for a second terminal device, the serving cell may be in the dormant state. For example, when the serving cell is in the dormant state for the first terminal device, the first terminal device does not receive a physical downlink control channel (PDCCH) or a physical downlink shared channel (PDSCH) corresponding to the serving cell, and cannot perform uplink transmission. However, when the serving cell is in the dormant state for the first terminal device, the first terminal device may perform CSI measurement, so that the serving cell can quickly switch to the active state.

In this embodiment of this application, the serving cell may include one or more BWPs, and the BWP may be a subset of an entire bandwidth in one serving cell. An embodiment of this application provides a BWP-based communication method. The method specifically relates to a method for performing communication in a dormant state of the BWP, an active state of the BWP, or a deactivated state of the BWP. It should be noted that the foregoing states of the BWP are for the terminal device. For example, a same BWP may be in the dormant state for one terminal device, and may be in the active state for another terminal device.

Figure 7:
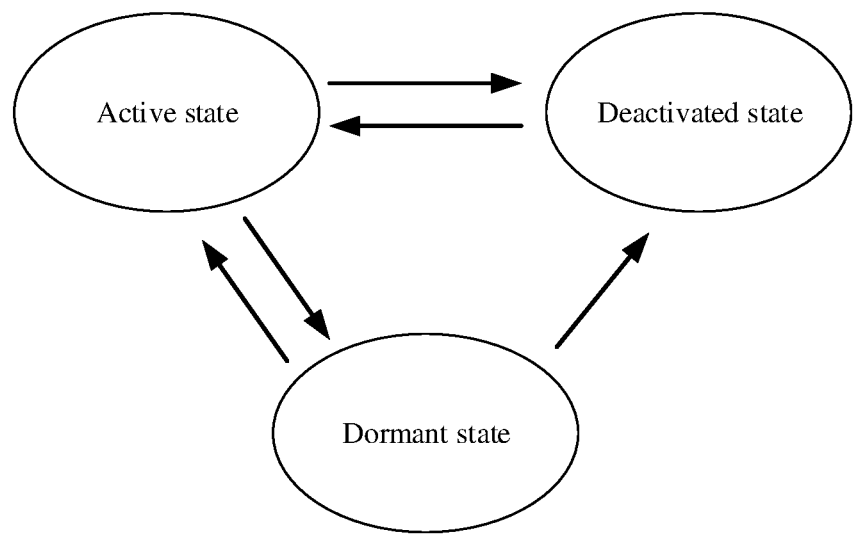
FIG. 7 is a schematic diagram of state switching of a bandwidth part (BWP) according to an embodiment of this application.

FIG. 7 is a schematic diagram of state switching of a BWP according to an embodiment of this application. As shown in FIG. 7, the BWP may switch from a dormant state to a deactivated state or an active state, may switch from an active state to a dormant state or a deactivated state, may switch from a deactivated state to an active state, or may switch from a deactivated state to a dormant state. Data scheduling may not be performed when the BWP is in the active state or the dormant state, and data scheduling may be performed when the BWP is in the active state. CSI of the BWP needs to be reported when the BWP is in the dormant state, and CSI of the BWP may not be reported when the BWP is in the deactivated state. Therefore, compared with power consumption generated when the BWP is in the dormant state, power consumption of the terminal device is reduced when the BWP is in the deactivated state.

In one embodiment, when the BWP is in the dormant state, the terminal device may report the CSI of the BWP, and the terminal device may further perform at least one of the following operations based on the BWP: skipping receiving a PDCCH by using the BWP, skipping sending a sounding reference signal (SRS) by using the BWP, skipping sending data of a physical uplink shared channel (PUSCH) by using the BWP, skipping sending a random access preamble signal by using the BWP, skipping monitoring a PDCCH for scheduling the BWP in a cross-carrier manner, and skipping sending a physical uplink control channel (PUCCH) by using the BWP. That is, when the BWP is in the dormant state, the terminal device may report only the CSI of the BWP. For example, the terminal device may measure a reference signal, for example, an SSB or a CSI-RS, of the BWP in the dormant state, to obtain a measurement result, and report the CSI of the BWP.

When the BWP is in the deactivated state, the terminal device may perform at least one of the following operations based on the BWP: skipping reporting the CSI of the BWP, skipping receiving a PDCCH by using the BWP, skipping sending an SRS by using the BWP, skipping sending data of a PUSCH by using the BWP, skipping sending a random access preamble signal by using the BWP, skipping monitoring a PDCCH for scheduling the BWP in a cross-carrier manner, and skipping sending a PUCCH by using the BWP. That is, when the BWP is in the deactivated state, the BWP may be invisible to the terminal device.

When the BWP is in the active state, the terminal device may perform at least one of the following operations based on the BWP: reporting the CSI of the BWP, receiving a PDCCH by using the BWP, sending an SRS by using the BWP, sending data of a PUSCH by using the BWP, sending a random access preamble signal by using the BWP, monitoring a PDCCH for scheduling the BWP in a cross-carrier manner, and sending a PUCCH by using the BWP.

Figure 8:
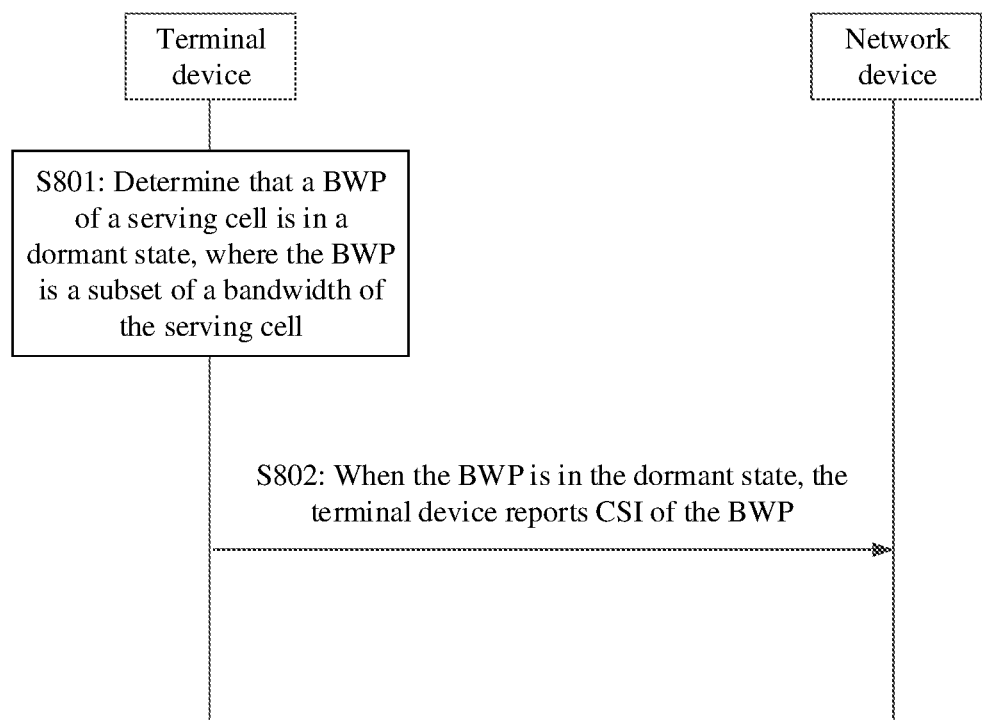
FIG. 8 is a schematic diagram of a communication method according to an embodiment of this application.

FIG. 8 further shows a communication method according to an embodiment of this application. As shown in FIG. 8, the communication method includes the following operations.

S801: A terminal device determines that a BWP of a serving cell is in a dormant state.

The serving cell may be a primary cell, or may be a secondary cell. The BWP in the dormant state may be a part of BWPs in the serving cell, or may be all BWPs in the serving cell. The BWP in the dormant state may be one BWP, or may be a plurality of BWPs.

S802: When the BWP is in the dormant state, the terminal device reports CSI of the BWP, and correspondingly, a network device receives the CSI of the BWP, and the terminal device further performs at least one of the following operations: skipping receiving a PDCCH by using the BWP, skipping sending an SRS by using the BWP, skipping sending data of a PUSCH by using the BWP, skipping sending a random access preamble signal by using the BWP, skipping monitoring a PDCCH for scheduling the BWP in a cross-carrier manner, and skipping sending a PUCCH by using the BWP.

In one embodiment, the terminal device may use another BWP in an active state to report the BWP in the dormant state. In one embodiment, the terminal device may report the CSI by using a special cell (SpCell) or a PUCCH secondary cell. In one embodiment, a resource used for reporting the CSI may be configured by the network device. For example, the SpCell may be a primary cell in a carrier aggregation scenario, or may be a primary cell or a primary secondary cell in a dual connectivity scenario.

In one embodiment, the cross-carrier scheduling may mean that control signaling carried on a first carrier may be used to indicate to schedule data on a second carrier. In other words, control signaling in a first cell is used to schedule data in a second cell. Usually, one cell may include at least one downlink carrier. In one embodiment, one cell may further include at least one uplink carrier, and one carrier may include one or more BWPs. For example, if control signaling on a first BWP is used to schedule data on a second BWP, and the first BWP and the second BWP belong to different carriers, the scheduling is cross-carrier scheduling. If the second BWP is in the dormant state, the terminal device may not monitor a PDCCH for scheduling the second BWP in a cross-carrier manner, that is, not monitor a PDCCH on the first BWP.

In one embodiment, CSI measurement may include CQI measurement. For a secondary cell in the dormant state, the network device may configure a corresponding CQI measurement parameter for the terminal device.

For a periodic CQI report and a semi-persistent CQI report, the CQI measurement parameter may include a reporting periodicity and an offset of the CQI report. The CQI measurement parameter may further include a wideband CQI measurement indicator, one or more narrowband CQI measurement indicators, one or more narrowband CQI reporting indicators, a CQI table, and the like.

One serving cell may support one or more BWPs, and the BWP is a subset of an entire bandwidth in one cell. If all BWPs in a serving cell are in the dormant state, the serving cell is in the dormant state. If a part of BWPs in a serving cell are in the dormant state, and remaining BWPs are in a deactivated state, the BWP of the serving cell is in the dormant state. If a part of BWPs in a serving cell are in the active state, the serving cell is in the active state.

In this embodiment of this application, when the BWP is in the dormant state, the terminal device may report the CSI based on the BWP. Because the terminal device may report the CSI of the BWP in the dormant state to the network device, after the BWP switches to the active state, the network device may quickly perform, based on the previously received CSI, effective BWP-based data scheduling with the terminal device.

In one embodiment, the terminal device may determine, in a plurality of manners, that the BWP of the serving cell is in the dormant state.

For example, in a manner, the terminal device may receive first indication information from the network device. Correspondingly, the network device sends the first indication information. The first indication information is used to indicate that the BWP is configured to be in the dormant state. After receiving the first indication information, the terminal device may determine that the BWP is in the dormant state. For another example, in one embodiment, the first indication information includes an identifier of the BWP.

In a specific example, the network device may send the first indication information to the terminal device. The first indication information includes an identifier of the one or more BWPs, and the first indication information may further indicate the terminal device to perform CSI measurement based on the one or more BWPs.

In one embodiment, the first indication information may be carried in downlink control information (DCI). Alternatively, the first indication information may be carried in secondary cell addition message, where the secondary cell addition message is used to indicate to add a secondary cell. Alternatively, the first indication information may be carried in primary secondary cell addition message, where the primary secondary cell addition message is used to indicate to add a primary secondary cell. Alternatively, the first indication information may be carried in a handover command. Alternatively, the first indication information may be carried in RRC signaling or a MAC control element (CE).

For another example, in another manner, the terminal device may alternatively determine, based on a timer, that the BWP of the serving cell is in the dormant state. For example, the terminal device may receive first activation information from the network device. Correspondingly, the network device sends the first activation information to the terminal device. The first activation information is used to indicate that the BWP is configured to be in the active state. After receiving the first activation information, the terminal device may start a first timer. The terminal device starts or restarts the first timer each time the terminal device performs data scheduling. When the first timer expires, the terminal device determines that the BWP is in the dormant state.

In other words, the terminal device may start the first timer after the BWP enters the active state. When the first timer expires, the terminal device determines that the BWP is in the dormant state. In this manner, indication information of the network device does not need to be received. Therefore, signaling overheads can be reduced. In addition, after the first timer is started, if the terminal device performs data scheduling, the terminal device needs to restart or start the first timer. For example, if the terminal device receives a cell radio network temporary identifier (C-RNTI) from the BWP in the active state, and a PDCCH scrambled by a configured scheduling radio network temporary identifier (CS-RNTI), the terminal device needs to restart or start the first timer of the BWP.

In an example, data scheduling in this application may include any one of the following cases: A PDCCH scrambled by a C-RNTI or a CS-RNTI is received on the BWP in the active state, where the PDCCH is used to indicate downlink allocation or an uplink grant, a MAC protocol data unit (PDU) is sent in a configured uplink grant, or a MAC PDU is received in configured downlink allocation, there is no ongoing random access process associated with a serving cell, when the PDCCH scrambled by the C-RNTI is received, the ongoing random access process associated with the serving cell is successfully completed.

In addition, after receiving the first activation information, the terminal device may immediately start the first timer, or may start the first timer after waiting for a period of time. This is not limited in this application. In one embodiment, duration of the first timer may be configured by the network device. For example, the network device may send second indication information to the terminal device, where the second indication information is used to indicate the duration of the first timer. In one embodiment, each BWP may correspond to one first timer. If there are a plurality of BWPs, first timers that are in a one-to-one correspondence with the plurality of BWPs may be configured.

In one embodiment, the first activation information may include two types. A first type is an activation command used to activate a cell, where the activated cell is a cell in which a BWP is located. A second type may be an activation command used to activate a BWP.

For example, the first activation information may be a cell activation command sent by the network device, to indicate all or a part of BWPs in the serving cell to switch from the dormant state to the active state, so as to facilitate scheduling. The first activation information may be carried in a media access control control element (MAC CE).

In one embodiment, the terminal device may determine, based on a timer, that the BWP enters the deactivated state. For example, the terminal device may start the second timer after the BWP enters the dormant state. When the second timer expires, the terminal device determines that the BWP is configured to be in the deactivated state.

In other words, the terminal device may start the second timer after the BWP enters the dormant state. When the second timer expires, the terminal device determines that the BWP is in the deactivated state. In this manner, the indication information of the network device does not need to be received. Therefore, signaling overheads can be reduced.

For example, the terminal device may start the second timer after receiving the first indication information. Alternatively, the terminal device may start the second timer after the first timer expires.

In addition, after receiving the first indication information or after the first timer expires, the terminal device may immediately start the second timer, or may start the second timer after waiting for a period of time. This is not limited in this application. In one embodiment, duration of the second timer may be configured by the network device. For example, the network device may send third indication information to the terminal device, where the third indication information is used to indicate the duration of the second timer. In one embodiment, each BWP may correspond to one second timer. If there are a plurality of BWPs, second timers that are in a one-to-one correspondence with the plurality of BWPs may be configured.

In one embodiment, in an example, the terminal device may receive fourth indication information sent by the network device, and the fourth indication information is used to indicate the BWP to switch from the deactivated state to the dormant state. After receiving the fourth indication information, the terminal device configures the BWP to be in the dormant state. In one embodiment, after receiving the fourth indication information, the terminal device may start a third timer. When the third timer expires, the terminal device may switch the BWP from the dormant state to the deactivated state. Duration of the third timer may be configured by a network.

Figure 9:
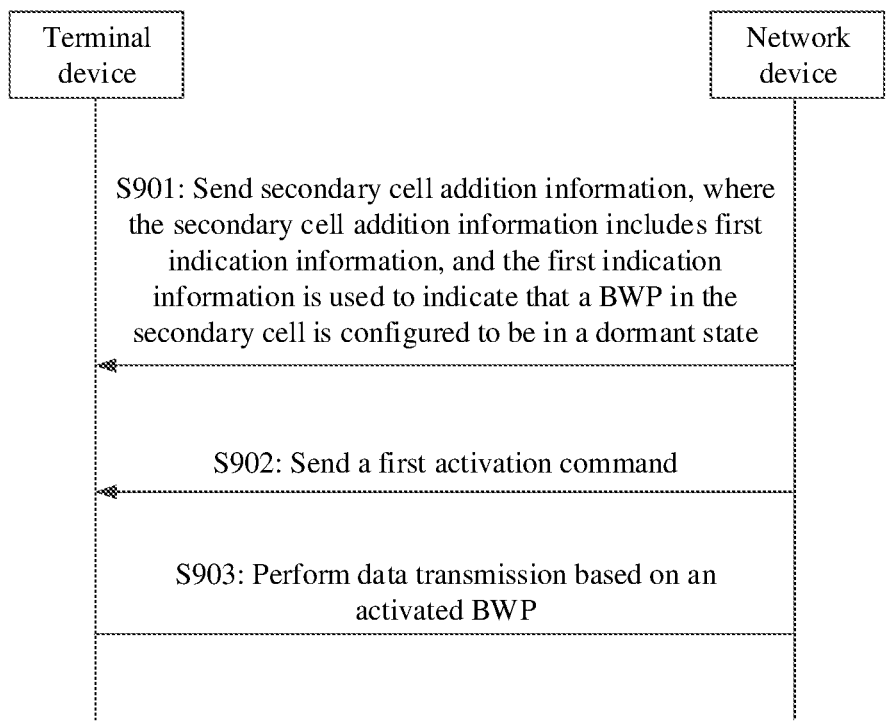
FIG. 9 is a schematic diagram of a communication method according to another embodiment of this application.

For example, FIG. 9 is a schematic diagram of a communication method according to another embodiment of this application. FIG. 9 shows a process in which a BWP switches from a dormant state to an active state. First indication information in FIG. 9 is carried in a secondary cell addition message. As shown in FIG. 9, the method includes the following operations.

S901: A network device sends the secondary cell addition message to a terminal device, and correspondingly, the terminal device receives the secondary cell addition message, where the secondary cell addition message includes the first indication information, and the first indication information is used to indicate that a BWP in the secondary cell is configured to be in the dormant state.

The secondary cell may include one or more BWPs. The BWP configured to be in the dormant state may be a part of BWPs in the secondary cell, or may be all BWPs in the secondary cell. The BWP configured to be in the dormant state may be one BWP, or may be a plurality of BWPs.

The first indication information may be, for example, indication information of a state of the BWP in the secondary cell. The information about the BWP state may include BWP identification information, for example, a BWP identifier.

In one embodiment, the secondary cell in S901 may not include a PUCCH secondary cell. In other words, a secondary cell in which a PUCCH is located cannot be configured to be in the dormant state.

In one embodiment, the secondary cell addition message may include identification information of the secondary cell. In one embodiment, the secondary cell addition message may further include indication information of a state of the secondary cell, which, for example, may indicate that the secondary cell is configured to be in the dormant state. In other words, the secondary cell addition message may indicate that the secondary cell is configured to be in the dormant state, and may indicate that one or more BWPs in the secondary cell are configured to be in the dormant state. For example, the secondary cell addition message may indicate that a first secondary cell is configured to be in the dormant state, and may further indicate that a first BWP and a second BWP in the first secondary cell are in the dormant state. The first BWP and the second BWP may be a part of BWPs in the first secondary cell, or may be all BWPs in the first secondary cell. In one embodiment, the secondary cell addition message may further include identification information of the secondary cell, which, for example, may be a cell index of the secondary cell.

In one embodiment, the terminal device may report CSI of the BWP in the dormant state to the network device. In this way, after receiving an activation command, the BWP can quickly switch to the active state, and effective data scheduling is performed.

In one embodiment, the secondary cell addition message may be carried in RRC signaling.

S902: The network device sends a first activation command to the terminal device, and correspondingly, the terminal device receives the first activation command, where the first activation command is used to activate the secondary cell.

In one embodiment, after receiving the first activation command, the terminal device may switch the BWP to from the dormant state to the active state. Because the terminal device may report the CSI of the BWP in the dormant state to the network device, after the BWP switches to the active state, the network device may quickly perform, based on the previously received CSI, effective BWP-based data scheduling with the terminal device.

In one embodiment, the first activation command may be used to activate a cell. After receiving the first activation command, the terminal device may enable the BWP to switch from the dormant state to the active state. Alternatively, the network device may further send a second activation command to the terminal device, and the second activation command may be used to activate a BWP in a cell. After receiving the second activation command, the terminal device may activate the corresponding BWP.

S903: The network device performs data transmission with the terminal device based on the activated BWP.

The foregoing describes the cell or beam measurement methods in the embodiments of this application with reference to FIG. 1 to FIG. 9. The following describes apparatuses in the embodiments of this application with reference to FIG. 10 to FIG. 15.

Figure 10:
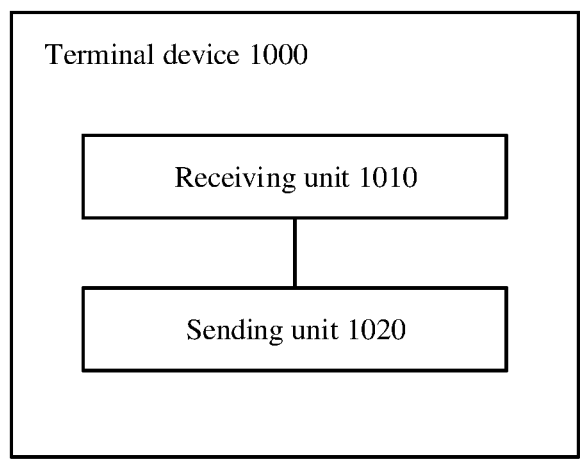
FIG. 10 is a schematic structural diagram of a terminal device according to an embodiment of this application.

FIG. 10 is a schematic block diagram of a terminal device woo according to an embodiment of this application. The terminal device woo can perform the operations performed by the terminal device in the method in FIG. 5, FIG. 6, or FIG. 9. To avoid repetition, details are not described herein again. The terminal device moo includes a receiving unit low and a sending unit 1020.

The receiving unit low is configured to receive first information from a network device, where the first information is used to indicate a measurement parameter used by the terminal device to perform cell measurement or beam measurement, and a detection signal for the cell measurement or the beam measurement includes at least an SSB or a CSI-RS. The sending unit 1020 is configured to send a measurement result of the cell measurement or the beam measurement to the network device based on the first information.

Alternatively, the receiving unit 1010 is configured to receive a secondary cell addition message from a network device, where the secondary cell addition message includes first indication information, and the first indication information is used to indicate that a BWP in the secondary cell is configured to be in a dormant state. The receiving unit 1010 is further configured to receive a first activation command from the network device, where the first activation command is used to activate the secondary cell. The receiving unit 1010 or the sending unit 1020 is configured to perform data transmission with the network device based on an activated BWP.

Figure 11:
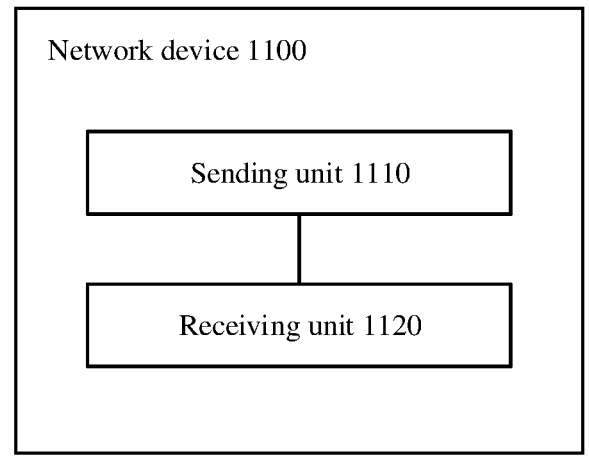
FIG. 11 is a schematic structural diagram of a network device according to an embodiment of this application.

FIG. 11 is a schematic block diagram of a network device 1100 according to an embodiment of this application. The network device 1100 can perform the operations performed by the network device in the method in FIG. 5, FIG. 6, or FIG. 9. To avoid repetition, details are not described herein again. The network device 1100 includes a sending unit 1110 and a receiving unit 1120.

The sending unit 1110 is configured to send first information to a terminal device, where the first information is used to indicate a measurement parameter used by the terminal device to perform cell measurement or beam measurement, and a detection signal for the cell measurement or the beam measurement includes at least an SSB or a CSI-RS. The receiving unit 1120 is configured to receive a measurement result of the cell measurement or the beam measurement.

Alternatively, the network device 1100 may be a secondary network device, and the sending unit 1110 may be configured to send third information to a secondary network device, where the third information is used to indicate at least a measurement cell list or a RAN area list that are/is recommended by the secondary network device.

Alternatively, the network device 1100 may be a primary network device, and the receiving unit 1120 may be configured to receive third information sent by a secondary network device, where the third information is used to indicate at least a measurement cell list or a RAN area list that are/is recommended by the secondary network device. The sending unit 1110 may send fourth information to a terminal device based on the third information, where the fourth information is used to indicate at least a cell list or a RAN area list for cell measurement performed by the terminal device.

Alternatively, the sending unit 1110 is configured to send a secondary cell addition message to a terminal device, where the secondary cell addition message includes first indication information, and the first indication information is used to indicate that a BWP in the secondary cell is configured to be in a dormant state. The sending unit 1110 is further configured to send a first activation command to the terminal device, where the first activation command is used to activate the secondary cell. The sending unit 1110 or the receiving unit 1120 is configured to perform data transmission with the terminal device based on an activated BWP.

Figure 12:
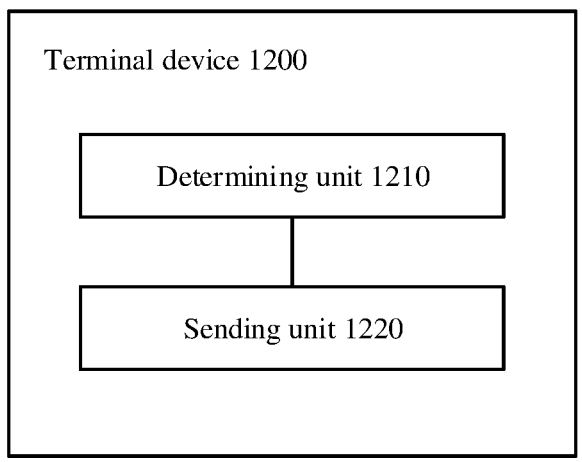
FIG. 12 is a schematic structural diagram of a terminal device according to another embodiment of this application.

FIG. 12 is a schematic block diagram of a terminal device 1200 according to an embodiment of this application. The terminal device 1200 can perform the operations performed by the terminal device in the method in FIG. 8. To avoid repetition, details are not described herein again. The terminal device 1200 includes a determining unit 1210 and a sending unit 1220.

The determining unit 1210 is configured to determine that a BWP of a serving cell is in a dormant state, where the BWP is a subset of a bandwidth of the serving cell. The sending unit 1220 is configured to when the BWP is in the dormant state, report CSI of the BWP to a network device. The determining unit 1210 further performs at least one of the following operations: skipping receiving a PDCCH by using the BWP, skipping sending an SRS by using the BWP, skipping sending data of a PUSCH by using the BWP, skipping sending a random access preamble signal by using the BWP, skipping monitoring a PDCCH for scheduling the BWP in a cross-carrier manner, and skipping sending a PUCCH by using the BWP.

Figure 13:
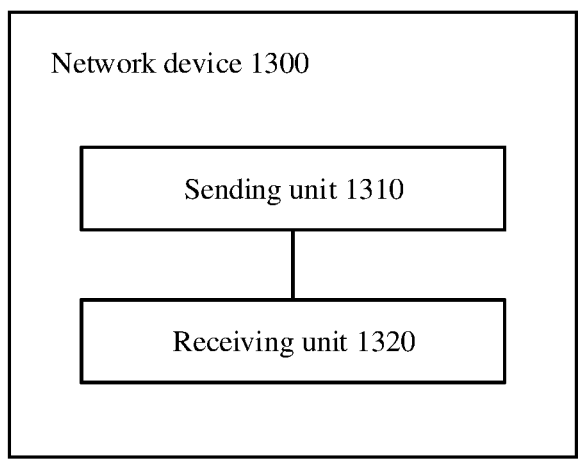
FIG. 13 is a schematic structural diagram of a network device according to another embodiment of this application.

FIG. 13 is a schematic block diagram of a network device 1300 according to an embodiment of this application. It should be understood that the network device 1300 can perform the operations performed by the network device in the method in FIG. 8. To avoid repetition, details are not described herein again. The network device 1300 includes a sending unit 1310 and a receiving unit 1320.

The sending unit 1310 is configured to send first indication information to a terminal device, where the first indication information is used to indicate that a BWP in a serving cell is configured to be in a dormant state, and the BWP is a subset of a bandwidth in the serving cell. The receiving unit 1320 is configured to receive CSI that is of the BWP and that is reported by the terminal device.

Figure 14:
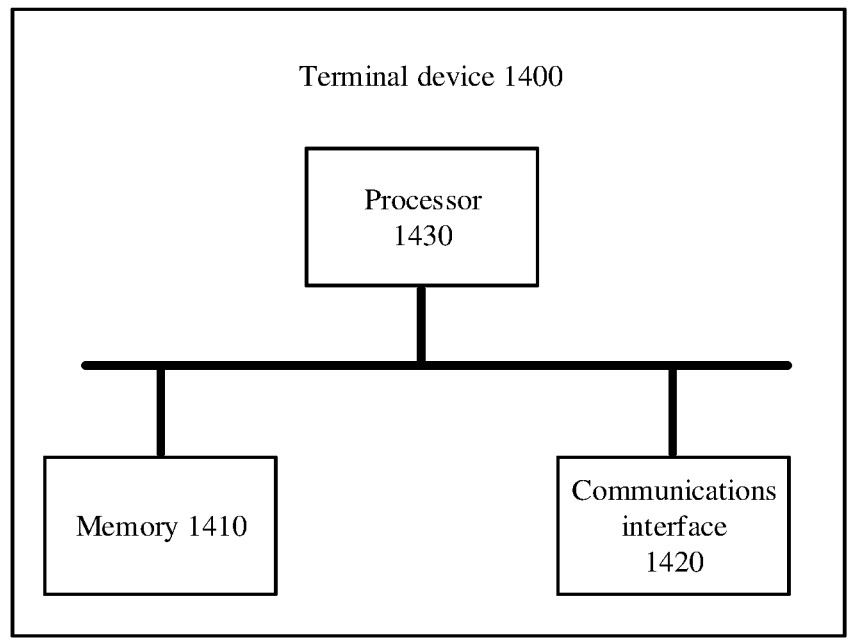
FIG. 14 is a schematic structural diagram of a terminal device according to another embodiment of this application.

FIG. 14 is a schematic block diagram of a terminal device 1400 according to an embodiment of this application. It should be understood that the terminal device 1400 can perform the operations performed by the terminal device in the method in FIG. 5, FIG. 6, FIG. 8, or FIG. 9. To avoid repetition, details are not described herein again. The terminal device 1400 includes a memory 1410, configured to store a program, a communications interface 1420, configured to communicate with another device, and a processor 1430, configured to execute the program that is in the memory 1410, where when the program is executed, the processor 1430 is configured to receive first information from a network device through the communications interface 1420, the first information is used to indicate a measurement parameter used by the terminal device to perform cell measurement or beam measurement, and a detection signal for the cell measurement or the beam measurement includes at least an SSB or a CSI-RS, and send a measurement result of the cell measurement or the beam measurement to the network device through the communications interface 1420 based on the first information.

Alternatively, the processor 1430 is configured to determine that a BWP of a serving cell is in a dormant state, where the BWP is a subset of a bandwidth of the serving cell, and when the BWP is in the dormant state, report CSI of the BWP to a network device through the communications interface 1420. The processor 1430 is further configured to perform at least one of the following operations: skipping receiving a PDCCH by using the BWP, skipping sending an SRS by using the BWP, skipping sending data of a PUSCH by using the BWP, skipping sending a random access preamble signal by using the BWP, skipping monitoring a PDCCH for scheduling the BWP in a cross-carrier manner, and skipping sending a PUCCH by using the BWP.

Alternatively, the processor 1430 is configured to receive a secondary cell addition message from a network device through the communications interface 1420, where the secondary cell addition message includes first indication information, and the first indication information is used to indicate that a BWP in the secondary cell is configured to be in a dormant state, receive a first activation command from the network device through the communications interface 1420, where the first activation command is used to activate the secondary cell, and perform data transmission with the network device based on an activated BWP through the communications interface 1420.

Figure 15:
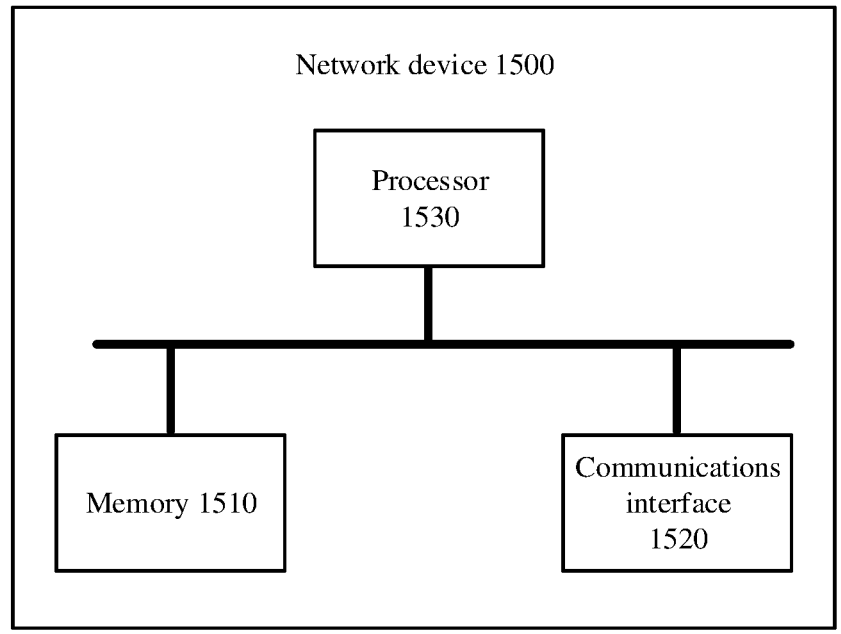
FIG. 15 is a schematic structural diagram of a network device according to another embodiment of this application.

FIG. 15 is a schematic block diagram of a network device 1500 according to an embodiment of this application. It should be understood that the network device 1500 can perform the operations performed by the network device in the method in FIG. 5, FIG. 6, FIG. 8, or FIG. 9. To avoid repetition, details are not described herein again. The network device 1500 includes a memory 1510, configured to store a program, a communications interface 1520, configured to communicate with another device, and a processor 1530, configured to execute the program that is in the memory 1510, where when the program is executed, the processor 1530 is configured to send first information to a terminal device through the communications interface 1520, the first information is used to indicate a measurement parameter used by the terminal device to perform cell measurement or beam measurement, and a detection signal for the cell measurement or the beam measurement includes at least an SSB or a CSI-RS, and receive a measurement result of the cell measurement or the beam measurement through the communications interface.

Alternatively, the network device 1500 is a secondary network device, and the processor 1530 is configured to send third information to a secondary network device through the communications interface 1520, where the third information is used to indicate at least a measurement cell list or a RAN area list that are/is recommended by the secondary network device.

Alternatively, the network device 1500 may be a primary network device, and the processor 1530 is configured to receive, through the communications interface 1520, third information sent by a secondary network device, where the third information is used to indicate at least a measurement cell list or a RAN area list that are/is recommended by the secondary network device. The sending unit 1110 may send fourth information to a terminal device based on the third information, where the fourth information is used to indicate at least a cell list or a RAN area list for cell measurement performed by the terminal device.

Alternatively, the processor 1530 is configured to send first indication information to a terminal device through the communications interface 1520, where the first indication information is used to indicate that a BWP in a serving cell is configured to be in a dormant state, and the BWP is a subset of a bandwidth in the serving cell, and receive, through the communications interface 1520, CSI that is of the BWP and that is reported by the terminal device.

Alternatively, the processor 1530 is configured to send a secondary cell addition message to a terminal device through the communications interface 1520, where the secondary cell addition message includes first indication information, and the first indication information is used to indicate that a BWP in the secondary cell is configured to be in a dormant state, send a first activation command to the terminal device through the communications interface 1520, where the first activation command is used to activate the secondary cell, and perform data transmission with the terminal device based on an activated BWP through the communications interface 1520.

A person of ordinary skill in the art may be aware that, with reference to the examples described in the embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatuses, and units, refer to corresponding processes in the foregoing method embodiments, and details are not described herein again.

In the several embodiments provided in this application, it should be understood that the disclosed system, apparatuses, and methods may be implemented in other manners. For example, the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations in the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A cell measurement method, comprising:
   receiving, by a terminal device, from a network device, first information, wherein the first information indicates a measurement parameter used by the terminal device to perform cell measurement in an inactive state, wherein the measurement parameter comprises validity area information that comprises a radio access network-based notification area (RNA) list that indicates that, after the terminal device leaves an area indicated in the RNA list, the terminal device does not need to perform cell measurement when the terminal device is in the inactive state, and wherein a detection signal for the cell measurement comprises at least a synchronization sequence or physical broadcast channel block (SSB) or a channel state information reference signal (CSI-RS);
   receiving, by the terminal device, second information from the network device, wherein the second information is carried in a radio resource control (RRC) resume message, and wherein the second information indicates that the terminal device is allowed to report a measurement result of the cell measurement in an RRC resume complete message; and
   sending, by the terminal device, the measurement result of the cell measurement to the network device based on the second information.

2. The method according to claim 1, wherein the measurement parameter comprises at least one of an SSB frequency, a subcarrier spacing, an SSB measurement timing configuration, an SSB measurement threshold, or a quantity of SSBs to average for measurement.

3. The method according to claim 1, wherein the measurement parameter comprises at least one of a CSI-RS carrier, a reference signal configuration, a CSI-RS measurement threshold, or a quantity of CSI-RSs to average for measurement.

4. The method according to claim 1, wherein the measurement parameter further comprises at least one of:
   cell priority information indicating to preferentially report a measurement result of a first cell;
   SSB priority information indicating to preferentially report a measurement result of a first SSB;
   CSI-RS priority information indicating to preferentially report a measurement result of a first CSI-RS;
   or
   radio access network (RAN) area priority information indicating to preferentially report a measurement result of a first RAN area.

5. The method according to claim 1, wherein the first information is carried in one of a radio resource control (RRC) connection release message, a broadcast message, or an RRC resume message.

6. The method according to claim 1, wherein the measurement result of the cell measurement is carried in a radio resource control (RRC) resume complete message.

7. The method according to claim 1, further comprising:
   sending, by the terminal device, air interface capability information to the network device, wherein the air interface capability information indicates at least one of whether the terminal device supports SSB-based cell measurement, whether the terminal device supports CSI-RS based cell measurement, whether the terminal device, while in the inactive state, supports SSB-based cell measurement, or whether the terminal device, while in the inactive state, supports CSI-RS based cell measurement.

8. A cell measurement method, comprising:
sending, by a network device, first information to a terminal device, wherein the first information indicates a measurement parameter used by the terminal device to perform cell measurement in an inactive state, wherein the measurement parameter comprises validity area information that comprises a radio access network-based notification area (RNA) list that indicates that, after the terminal device leaves an area indicated in the RNA list, the terminal device does not need to perform cell measurement when the terminal device is in the inactive state, and wherein a detection signal for the cell measurement comprises at least a synchronization sequence or physical broadcast channel block (SSB) or a channel state information reference signal (CSI-RS);
sending, by the network device, second information to the terminal device, wherein the second information is carried in a radio resource control (RRC) resume message, and wherein the second information indicates that the terminal device is allowed to report a measurement result of the cell measurement in an RRC resume complete message; and
receiving, by the network device, the measurement result of the cell measurement.

9. The method according to claim 8, wherein the measurement parameter comprises at least one of an SSB frequency, a subcarrier spacing, an SSB measurement timing configuration, an SSB measurement threshold, or a quantity of SSBs to average for measurement.

10. The method according to claim 8, wherein the measurement parameter comprises at least one a CSI-RS carrier, a reference signal configuration, a CSI-RS measurement threshold, or a quantity of CSI-RSs to average for measurement.

11. The method according to claim 8, wherein the measurement parameter further comprises at least one of:
cell priority information indicating to preferentially report a measurement result of a first cell;
SSB priority information indicating to preferentially report a measurement result of a first SSB;
CSI-RS priority information indicating to preferentially report a measurement result of a first CSI-RS;
or
radio access network (RAN) area priority information indicating to preferentially report a measurement result of a first RAN area.

12. The method according to claim 8, wherein the first information is carried in one of an RRC connection release message, a broadcast message, or a radio resource control (RRC) resume message.

13. The method according to claim 8, wherein the measurement result of the cell measurement is carried in a radio resource control (RRC) resume complete message.

14. The method according to claim 8, further comprising:
receiving, by the network device, air interface capability information from the terminal device, wherein the air interface capability information indicates at least one of whether the terminal device supports SSB-based cell measurement, whether the terminal device supports CSI-RS based cell measurement, whether the terminal device, while in the inactive state, supports SSB-based cell measurement, or whether the terminal device, while in the inactive state, supports CSI-RS based cell measurement.

15. A terminal device, comprising:
a communications interface;
at least one processor, connected to the communications interface; and a non-transitory computer readable memory storing a program to be executed by the at least one processor, the program including instructions for:
receiving first information from a network device through the communications interface, wherein the first information indicates a measurement parameter used by the terminal device to perform cell measurement in an inactive state, wherein the measurement parameter comprises validity area information validity area information that comprises a radio access network-based notification area (RNA) list that indicates that, after the terminal device leaves an area indicated in the RNA list, indicating that, after the terminal device leaves a validity area, the terminal device does not need to perform cell measurement when the terminal device is in the inactive state, and wherein a detection signal for the cell measurement comprises at least a synchronization sequence or physical broadcast channel block (SSB) or a channel state information reference signal (CSI-RS);
receiving second information from the network device, wherein the second information is carried in a radio resource control (RRC) resume message, and wherein the second information indicates that the terminal device is allowed to report a measurement result of the cell measurement in an RRC resume complete message; and
sending the measurement result of the cell measurement to the network device through the communications interface based on the first information.

16. The terminal device according to claim 15, wherein the measurement parameter comprises at least one of an SSB frequency, a subcarrier spacing, an SSB measurement timing configuration, an SSB measurement threshold, or a quantity of SSBs to average for measurement.

17. The terminal device according to claim 15, wherein the measurement parameter comprises at least one of a CSI-RS carrier, a reference signal configuration, a CSI-RS measurement threshold, or a quantity of CSI-RSs to average for measurement.

18. The terminal device according to claim 15, wherein the measurement parameter further comprises at least one of:
cell priority information indicating to preferentially report a measurement result of a first cell;
SSB priority information indicating to preferentially report a measurement result of a first SSB;
CSI-RS priority information indicating to preferentially report a measurement result of a first CSI-RS;
or
radio access network (RAN) area priority information indicating to preferentially report a measurement result of a first RAN area.

19. The terminal device according to claim 15, wherein the first information is carried in one of an RRC connection release message, a broadcast message, or a radio resource control (RRC) resume message.

20. The terminal device according to claim 15, wherein the measurement result of the cell measurement is carried in a radio resource control (RRC) resume complete message.

21. The terminal device according to claim 15, wherein the program further includes instructions to send air interface capability information to the network device through the communications interface, wherein the air interface capability information indicates at least one of whether the terminal device supports SSB-based cell measurement, whether the terminal device supports CSI-RS based cell measurement, whether the terminal device, while in the inactive state, supports SSB-based cell measurement, or whether the terminal device, while in the inactive state, supports CSI-RS based cell measurement.

22. A network device, comprising:
a communications interface;
at least one processor, connected to the communications interface; and
a non-transitory computer readable memory storing a program to be executed by the at least one processor, the program including instructions for:
sending first information to a terminal device through the communications interface, wherein the first information indicates a measurement parameter used by the terminal device to perform cell measurement in an inactive state, wherein the measurement parameter comprises validity area information that comprises a radio access network-based notification area (RNA) list that indicates that, after the terminal device leaves an area indicated in the RNA list, the terminal device does not need to perform cell measurement when the terminal device is in the inactive state, and wherein a detection signal for the cell measurement comprises at least one of a synchronization sequence, or a physical broadcast channel block (SSB), or a channel state information reference signal (CSI-RS);
sending, by the network device, second information to the terminal device, wherein the second information is carried in a radio resource control (RRC) resume message, and wherein the second information indicates that the terminal device is allowed to report a measurement result of the cell measurement in an RRC resume complete message; and
receiving the measurement result of the cell measurement through the communications interface.

23. The network device according to claim 22, wherein the measurement parameter comprises at least one of a SSB frequency, a subcarrier spacing, an SSB measurement timing configuration, an SSB measurement threshold, or a quantity of SSBs to average for measurement.

24. The network device according to claim 22, wherein the measurement parameter comprises at least one of:
a CSI-RS carrier, a reference signal configuration, a CSI-RS measurement threshold, or a quantity of CSI-RSs to average for measurement.

25. The network device according to claim 22, wherein the measurement parameter comprises at least one of:
cell priority information indicating to preferentially report a measurement result of a first cell;
SSB priority information indicating to preferentially report a measurement result of a first SSB;
CSI-RS priority information indicating to preferentially report a measurement result of a first CSI-RS;
or
radio access network (RAN) area priority information indicating to preferentially report a measurement result of a first RAN area.

26. The network device according to claim 22, wherein the first information is carried in at least one of a radio resource control (RRC) connection release message, a broadcast message, or an RRC resume message.

27. The network device according to claim 22, wherein the measurement result of the cell measurement is carried in a radio resource control (RRC) resume complete message.

28. The network device according to claim 22, wherein the program further includes instructions for receiving air interface capability information from the terminal device through the communications interface, wherein the air interface capability information indicates at least one of whether the terminal device supports SSB-based cell measurement, whether the terminal device supports CSI-RS based cell measurement, whether the terminal device, while in the inactive state, supports SSB-based cell measurement, or whether the terminal device, while in the inactive state, supports CSI-RS based cell measurement.

29. A non-transitory computer-readable storage medium, wherein the non-transitory computer-readable storage medium stores a computer program for execution by a processor of a terminal device, the program including instructions for
receiving first information from a network device, wherein the first information indicates a measurement parameter used by the terminal device to perform cell measurement in an inactive state, wherein the measurement parameter comprises validity area information that comprises a radio access network-based notification area (RNA) list that indicates that, after the terminal device leaves an area indicated in the RNA list, the terminal device does not need to perform cell measurement when the terminal device is in the inactive state, and wherein a detection signal for the cell measurement comprises at least a synchronization sequence or physical broadcast channel block (SSB) or a channel state information reference signal (CSI-RS);
receiving second information from the network device, wherein the second information is carried in a radio resource control (RRC) resume message, and wherein the second information indicates that the terminal device is allowed to report a measurement result of the cell measurement in an RRC resume complete message; and
sending the measurement result of the cell measurement to the network device based on the first information.

30. A non-transitory computer-readable storage medium, wherein the non-transitory computer-readable storage medium stores a computer program for execution by a processor of a network device, the program including instructions for:
sending first information to a terminal device, wherein the first information indicates a measurement parameter used by the terminal device to perform cell measurement in an inactive state, wherein the measurement parameter comprises validity area information validity area information that comprises a radio access network-based notification area (RNA) list that indicates that, after the terminal device leaves an area indicated in the RNA list, the terminal device does not need to perform cell measurement when the terminal device is in the inactive state, and wherein a detection signal for the cell measurement comprises at least a synchronization sequence or physical broadcast channel block (SSB) or a channel state information reference signal (CSI-RS);
sending, by the network device, second information to the terminal device, wherein the second information is carried in a radio resource control (RRC) resume message, and wherein the second information indicates that the terminal device is allowed to report a measurement result of the cell measurement in an RRC resume complete message; and receiving the measurement result of the cell measurement.

\* \* \* \* \*